(12) United States Patent
Yu et al.

(10) Patent No.: US 11,784,587 B2
(45) Date of Patent: Oct. 10, 2023

(54) ELECTRONIC SENSING APPARATUS AND A METHOD OF PRODUCING THE ELECTRONIC SENSING APPARATUS

(71) Applicant: City University of Hong Kong, Kowloon (HK)

(72) Inventors: Xinge Yu, Kowloon (HK); Jiahui He, Kowloon (HK)

(73) Assignee: City University of Hong Kong, Kowloon (HK)

( * ) Notice: Subject to any disclaimer, the term of this patent is extended or adjusted under 35 U.S.C. 154(b) by 66 days.

(21) Appl. No.: 17/556,139

(22) Filed: Dec. 20, 2021

(65) Prior Publication Data
US 2022/0216809 A1    Jul. 7, 2022

Related U.S. Application Data

(60) Provisional application No. 63/134,688, filed on Jan. 7, 2021.

(51) Int. Cl.
*H02N 1/04* (2006.01)
*G06F 3/01* (2006.01)

(52) U.S. Cl.
CPC .............. *H02N 1/04* (2013.01); *G06F 3/014* (2013.01)

(58) Field of Classification Search
CPC ............. H02N 1/04; H02N 1/00; G06F 3/014
USPC ................................................. 310/309, 310
See application file for complete search history.

(56) References Cited

U.S. PATENT DOCUMENTS

| | | | |
|---|---|---|---|
| 10,439,517 B2 | 10/2019 | Wang et al. | |
| 10,498,259 B2 | 12/2019 | Aliane | |
| 10,549,429 B2 | 2/2020 | Duchaine et al. | |
| 11,601,071 B1* | 3/2023 | Yu | H02N 1/04 |
| 2017/0317609 A1* | 11/2017 | Kim | H02N 1/04 |
| 2020/0016878 A1* | 1/2020 | Ma | B32B 27/10 |
| 2022/0216809 A1* | 7/2022 | Yu | H02N 1/04 |
| 2023/0099318 A1* | 3/2023 | Kim | H02N 1/04 |
| | | | 310/310 |
| 2023/0109824 A1* | 4/2023 | Oh | H02N 1/04 |
| | | | 310/310 |

FOREIGN PATENT DOCUMENTS

| | | |
|---|---|---|
| CN | 110836692 | 2/2020 |
| WO | WO 2021095947 | * 5/2021 |

OTHER PUBLICATIONS

Skin-Integrated Graphene-Embedded Lead Zirconate Titanate Rubber for Energy Harvesting and Mechanical Sensing; Liu et al. (Year: 2019).*

An epidermal sEMG tattoo-like patch as a new human-machine interface for patients with loss of voice; Wei et al. (Year: 2020).*

(Continued)

*Primary Examiner* — Ahmed Elnakib
(74) *Attorney, Agent, or Firm* — RENNER KENNER GREIVE BOBAK TAYLOR & WEBER

(57) ABSTRACT

An electronic sensing apparatus and a method of producing the electronic sensing apparatus includes a triboelectric generator encapsulated between a bottom substrate and a top encapsulation layer, wherein the triboelectric generator is arranged to generate a triboelectric sensing signal in response to a deformation of the bottom substrate and/or the top encapsulation layer.

26 Claims, 20 Drawing Sheets

(56) References Cited

OTHER PUBLICATIONS

H. Wu, W. Gao, Z. Yin, Advanced Healthcare Materials 2017, 6, 1700017.
H. Lee, C. Song, S. Baik, D. Kim, T. Hyeon, D. H. Kim, Adv Drug Deliv Rev 2018, 127, 35.
S. Choi, H. Lee, R. Ghaffari, T. Hyeon, D.-H. Kim, Advanced Materials 2016, 28, 4203.
Y. Khan, A. E. Ostfeld, C. M. Lochner, A. Pierre, A. C. Arias, Advanced Materials 2016, 28, 4373.
H.- R. Lim, H. S. Kim, R. Qazi, Y.-T. Kwon, J.-W. Jeong, W.-H. Yeo, Advanced Materials 2020, 32, 1901924.
H. Xu, J. X. Xiang, Y. F. Lu, M. K. Zhang, J. J. Li, B. B. Gao, Y. J. Zhao, Z. Z. Gu, ACS Applied Materials & Interfaces 2018, 10, 11785.
X. Yu, Z. Xie, Y. Yu, J. Lee, A. Vazquez-Guardado, H. Luan, J. Ruban, X. Ning, A. Akhtar, D. Li, B. Ji, Y. Liu, R. Sun, J. Cao, Q. Huo, Y. Zhong, C. Lee, S. Kim, P. Gutruf, C. Zhang, Y. Xue, Q. Guo, A. Chempakasseril, P. Tian, W. Lu, J. Jeong, Y. Yu, J. Comman, C. Tan, B. Kim, K. Lee, X. Feng, Y. Huang, J. A. Rogers, Nature 2019, 575, 473.
J. C. Yang, J. Mun, S. Y. Kwon, S. Park, Z. Bao, S. Park, Advanced Materials 2019, 31, 1904765.
K. Sim, Z. Rao, Z. Zou, F. Ershad, J. Lei, A. Thukral, J. Chen, Q.-A. Huang, J. Xiao, C. Yu, Science Advances 2019, 5, eaav9653.
S. Choi, S. I. Han, D. Jung, H. J. Hwang, C. Lim, S. Bae, O. K. Park, C. M. Tschabrunn, M. Lee, S. Y. Bae, J. W. Yu, J. H. Ryu, S.-W. Lee, K. Park, P. M. Kang, W. B. Lee, R. Nezafat, T. Hyeon, D.-H. Kim, Nature Nanotechnology 2018, 13, 1048.
M. Wang, P. Baek, A. Akbarinejad, D. Barker, J. Travas-Sejdic, Journal of Materials Chemistry C 2019, 7, 5534.
A. J. Bandodkar, R. Nuñez-Flores, W. Jia, J. Wang, Advanced Materials 2015, 27, 3060.
Y. Kim, J. Zhu, B. Yeom, M. Di Prima, X. Su, J.-G. Kim, S. J. Yoo, C. Uher, N. A. Kotov, Nature 2013, 500, 59.
N. Matsuhisa, M. Kaltenbrunner, T. Yokota, H. Jinno, K. Kuribara, T. Sekitani, T. Someya, Nature Communications 2015, 6, 7461.
S. Zhang, Y. Li, Q. Tian, L. Liu, W. Yao, C. Chi, P. Zeng, N. Zhang, W. Wu, Journal of Materials Chemistry C 2018, 6, 3999.
J. Park, S. Wang, M. Li, C. Ahn, J. K. Hyun, D. S. Kim, D. K. Kim, J. A. Rogers, Y. Huang, S. Jeon, Nature Communications 2012, 3, 916.
Q. Hua, J. Sun, H. Liu, R. Bao, R. Yu, J. Zhai, C. Pan, Z. L. Wang, Nature Communications 2018, 9, 244.
S.-K. Kang, R. K. J. Murphy, S.-W. Hwang, S. M. Lee, D. V. Harburg, N. A. Krueger, J. Shin, P. Gamble, H. Cheng, S. Yu, Z. Liu, J. G. McCall, M. Stephen, H. Ying, J. Kim, G. Park, R. C. Webb, C. H. Lee, S. Chung, D. S. Wie, A. D. Gujar, B. Vemulapalli, A. H. Kim, K.-M. Lee, J. Cheng, Y. Huang, S. H. Lee, P. V. Braun, W. Z. Ray, J. A. Rogers, Nature 2016, 530, 71.
J. Yang, R. Shi, Z. Lou, R. Chai, K. Jiang, G. Shen, Small 2019, 15, 1902801.
J. Hanna, M. Bteich, Y. Tawk, A. H. Ramadan, B. Dia, F. A. Asadallah, A. Eid, R. Kanj, J. Costantine, A. A. Eid, Science Advances 2020, 6, eaba5320.
F. J. Romero, E. Castillo, A. Rivadeneyra, A. Toral-Lopez, M. Becherer, F. G. Ruiz, N. Rodriguez, D. P. Morales, npj Flexible Electronics 2019, 3, 12.
S. Lin, J. Liu, W. Li, D. Wang, Y. Huang, C. Jia, Z. Li, M. Murtaza, H. Wang, J. Song, Z. Liu, K. Huang, D. Zu, M. Lei, B. Hong, H. Wu, Nano Letters 2019, 19, 6853.
A. Chortos, J. Liu, Z. Bao, Nat Mater 2016, 15, 937.
M. L. Hammock, A. Chortos, B. C. Tee, J. B. Tok, Z. Bao, Adv Mater 2013, 25, 5997.
J. C. Yang, J. Mun, S. Y. Kwon, S. Park, Z. Bao, S. Park, Adv Mater 2019, 31, e1904765.
A. Nozariasbmarz, H. Collins, K. Dsouza, M. H. Polash, M. Hosseini, M. Hyland, J. Liu, A. Malhotra, F. M. Ortiz, F. Mohaddes, V. P. Ramesh, Y. Sargolzaeiaval, N. Snouwaert, M. C. Ozturk, D. Vashaee, Applied Energy 2020, 258.
F. Suarez, D. P. Parekh, C. Ladd, D. Vashaee, M. D. Dickey, M. C. Öztürk, Applied Energy 2017, 202, 736.
Y. M. Liu, L. Zhao, L. Y. Wang, H. X. Zheng, D. F. Li, R. Avila, K. W. C. Lai, Z. K. Wang, Z. Q. Xie, Y. L. Zi, X. E. Yu, Advanced Materials Technologies, DOI: 10.1002/admt.201900744.
B. Z. Tian, X. L. Zheng, T. J. Kempa, Y. Fang, N. F. Yu, G. H. Yu, J. L. Huang, C. M. Lieber, Nature 2007, 449, 885.
Q. Guo, J. Koo, Z. Xie, R. Avila, X. Yu, X. Ning, H. Zhang, X. Liang, S. B. Kim, Y. Yan, M. R. MacEwan, H. M. Lee, A. Song, Z. Di, Y. Huang, Y. Mei, J. A. Rogers, Advanced Functional Materials 2019, 29, 1905451.
L. Zhao, Q. Zheng, H. Ouyang, H. Li, L. Yan, B. Shi, Z. Li, Nano Energy 2016, 28, 172.
H. Yang, Y. Pang, T. Bu, W. Liu, J. Luo, D. Jiang, C. Zhang, Z. L. Wang, Nature Communications 2019, 10, 2309.
C. Xu, B. B. Zhang, A. C. Wang, H. Y. Zou, G. L. Liu, W. B. Ding, C. S. Wu, M. Ma, P. Z. Peng, Z. Q. Lin, Z. L. Wang, Acs Nano 2019, 13, 2034.
F.-R. Fan, Z.-Q. Tian, Z. Lin Wang, Nano Energy 2012, 1, 328.
Z. Ren, J. Nie, J. Shao, Q. Lai, L. Wang, J. Chen, X. Chen, Z. L. Wang, Advanced Functional Materials 2018, 28.
F.-R. Fan, L. Lin, G. Zhu, W. Wu, R. Zhang, Z. L. Wang, Nano Letters 2012, 12, 3109.
D. Tantraviwat, P. Buarin, S. Suntalelat, W. Sripumkhai, P. Pattamang, G. Rujijanagul, B. Inceesungvorn, Nano Energy 2020, 67, 104214.
X. Pu, H. Guo, Q. Tang, J. Chen, L. Feng, G. Liu, X. Wang, Y. Xi, C. Hu, Z. L. Wang, Nano Energy 2018, 54, 453.
F. Wen, Z. Sun, T. He, Q. Shi, M. Zhu, Z. Zhang, L. Li, T. Zhang, C. Lee, Advanced Science 2020, 7, 2000261.
C. Lu, J. Chen, T. Jiang, G. Gu, W. Tang, Z. L. Wang, Advanced Materials Technologies 2018, 3, 1800021.
Z. Zhou, S. Padgett, Z. Cai, G. Conta, Y. Wu, Q. He, S. Zhang, C. Sun, J. Liu, E. Fan, K. Meng, Z. Lin, C. Uy, J. Yang, J. Chen, Biosensors and Bioelectronics 2020, 155, 112064.
X. X. Zhu, X. S. Meng, S. Y. Kuang, X. D. Wang, C. F. Pan, G. Zhu, Z. L. Wang, Nano Energy 2017, 41, 387.
H. Kang, C. Zhao, J. Huang, D. H. Ho, Y. T. Megra, J. W. Suk, J. Sun, Z. L. Wang, Q. Sun, J. H. Cho, Advanced Functional Materials 2019, 29.
X. Pu, M. Liu, X. Chen, J. Sun, C. Du, Y. Zhang, J. Zhai, W. Hu, Z. L. Wang, Science Advances 2017, 3, e1700015.
K. Yao, Y. Liu, D. Li, J. He, J. Li, R. H. W. Lam, Z. Xie, L. Wang, X. Yu, Nano Energy 2020, 76, 105017.
Y. Liu, L. Wang, L. Zhao, K. Yao, Z. Xie, Y. Zi, X. Yu, Advanced Electronic Materials 2020, 6, 1901174.
X. Peng, K. Dong, C. Ye, Y. Jiang, S. Zhai, R. Cheng, D. Liu, X. Gao, J. Wang, Z. L. Wang, Science Advances 2020, 6, eaba9624.
X. X. Zhu, Z. B. Li, X. S. Li, L. Su, X. Y. Wei, S. Y. Kuang, B. W. Su, J. Yang, Z. L. Wang, G. Zhu, Nano Energy 2018, 50, 497.

* cited by examiner

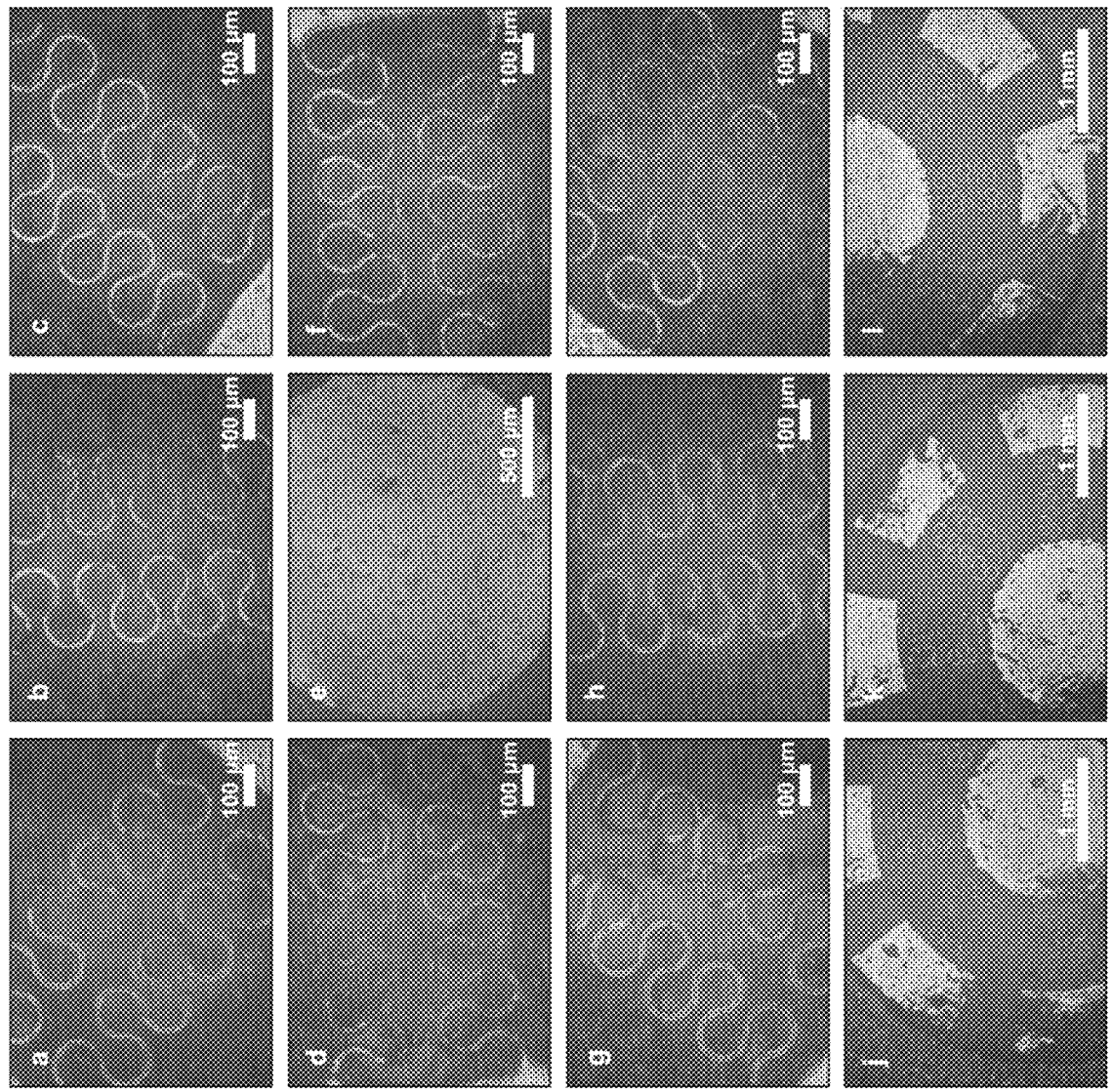

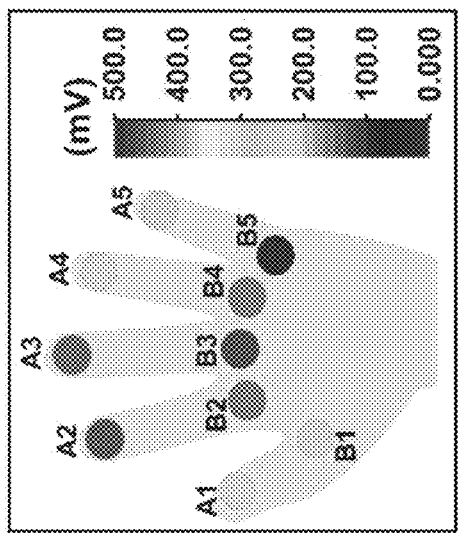
FIG. 16C
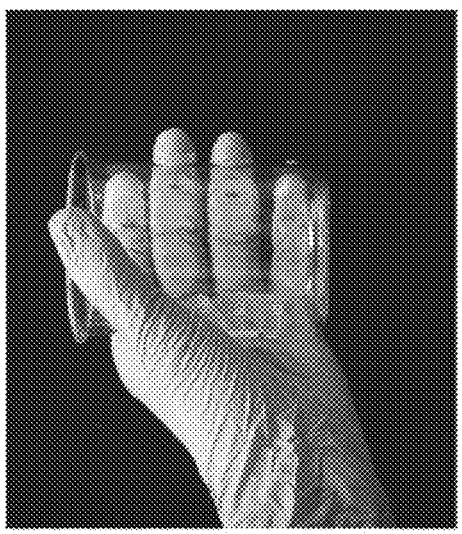
FIG. 16A
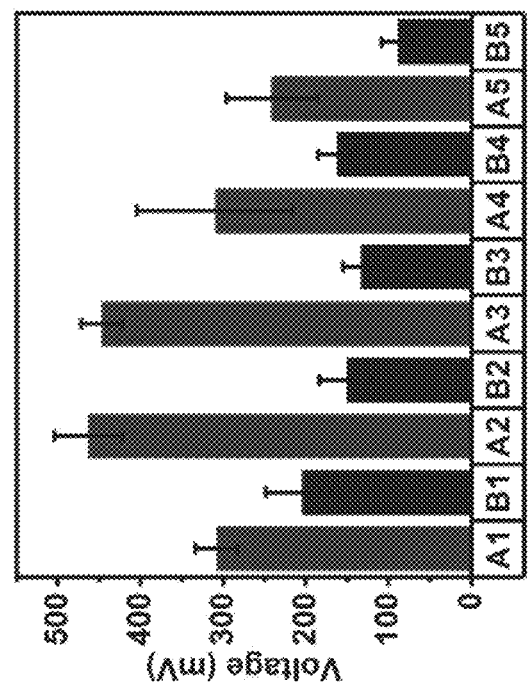
FIG. 16B
FIG. 16D

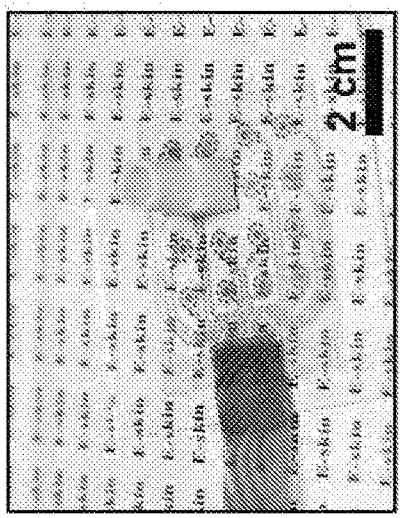
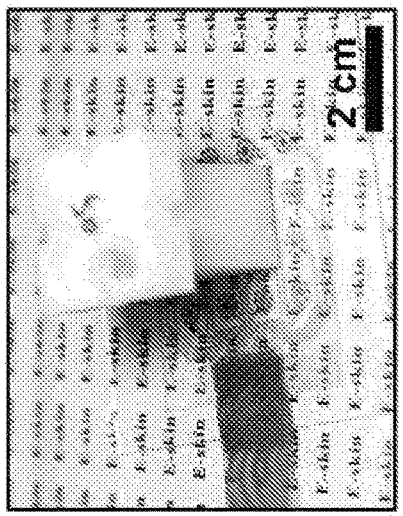
FIG. 18
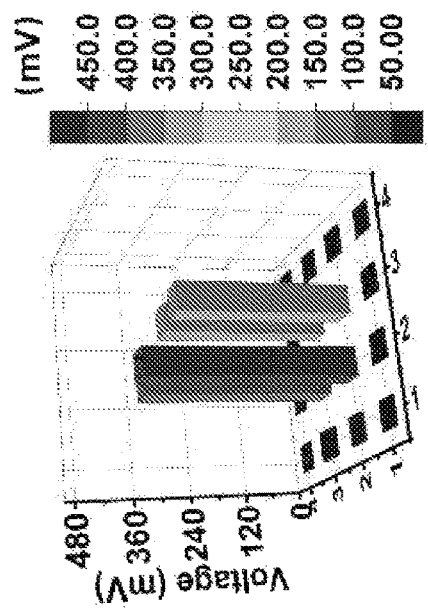
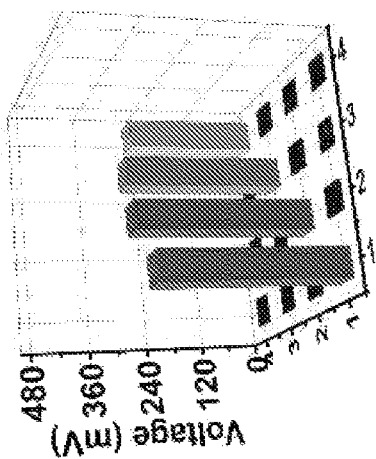
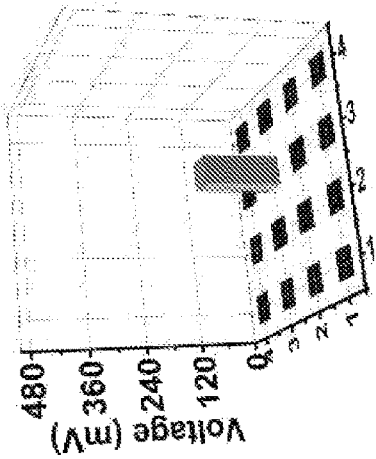
FIG. 19

ELECTRONIC SENSING APPARATUS AND A METHOD OF PRODUCING THE ELECTRONIC SENSING APPARATUS

TECHNICAL FIELD

The present invention relates to an electronic sensing apparatus and a method of producing the electronic sensing apparatus, in particular, but not limited to a wearable electronic sensing device for receiving tactile inputs.

BACKGROUND

Ultrathin and soft electronics may be used in various kinds of applications in the field of wearable technologies, such as healthcare, environmental monitoring and human-machine interfaces. Intrinsically flexible/stretchable materials and different structural mechanics designs, may be adopted in various kinds of soft devices for sensing of bio-physical and bio-chemical signals such as strain, temperature, humidity, blood glucose, electrocardiogram (ECG) and electroencephalogram (EEG).

In some example embodiments, advanced technologies in flexible electronics may be employed in wearable devices, like electronic skin (E-skin). However, the powering issue of these devices may limit the size, weight and cost for E-skin, other flexible electronics or wearable devices.

SUMMARY OF THE INVENTION

In accordance with a first aspect the present invention, there is provided an electronic sensing apparatus comprising a triboelectric generator encapsulated between a bottom substrate and a top encapsulation layer, wherein the triboelectric generator is arranged to generate a triboelectric sensing signal in response to a deformation of the bottom substrate and/or the top encapsulation layer.

In an embodiment the first aspect, the deformation includes at least one of stretching, twisting, and bending of the bottom substrate and/or the top encapsulation layer, and/or a depression of the top encapsulation layer towards the bottom substrate.

In an embodiment the first aspect, the triboelectric generator comprises a copper electrode sandwiched by opposite layers of polyimide.

In an embodiment the first aspect, the top encapsulation layer comprises a triboelectric functional region overlapping with the copper electrode.

In an embodiment the first aspect, the triboelectric charges are generated at the triboelectric functional region of the top encapsulation layer when the triboelectric functional region is in contact with an external object being electrically charged.

In an embodiment the first aspect, the triboelectric sensing signal is generated when the copper electrode is charged by the electrically charged triboelectric functional region, upon the external object separates from the triboelectric functional region of the top encapsulation layer.

In an embodiment the first aspect, the triboelectric functional region is charged when being touched.

In an embodiment the first aspect, the triboelectric functional region of the top encapsulation layer includes a roughen structure defined by a plurality of micro-structures.

In an embodiment the first aspect, the roughen structure is arranged to deform a skin surface in contact with the plurality of micro-structures on the triboelectric functional region thereby increasing an effective contact area between the skin surface and the top encapsulation layer at the triboelectric functional region.

In an embodiment the first aspect, the micro-structures includes pyramid structures.

In an embodiment the first aspect, the copper electrode comprises a middle island overlapping with at least a portion of the triboelectric functional region of the top encapsulation layer, and a metal pad electrically connected to the middle island, the metal pad is arranged to facilitate an output of the triboelectric sensing signal.

In an embodiment the first aspect, the middle island and the metal pad is connected by a serpentine metallic trace arranged to alter the triboelectric sensing signal when being subjected to a stretching deformation.

In an embodiment the first aspect, the copper electrode further comprises a plurality of peripheral islands surrounding the middle island and each being electrically connected to the middle island with an intermediate serpentine metallic trace.

In an embodiment the first aspect, each of the plurality of peripheral islands is connected to the middle island with a pair of intermediate serpentine metallic traces.

In an embodiment the first aspect, the copper electrode is arranged to detect a stretching deformation of the bottom substrate and/or the top encapsulation layer in both in-plane and out-of-plane directions.

In an embodiment the first aspect, the bottom substrate and the top encapsulation layer includes PDMS.

In an embodiment the first aspect, the bottom substrate is adapted to adhere to a skin surface by Van Der Waals forces.

In an embodiment the first aspect, the electronic sensing apparatus further comprises a plurality of triboelectric generator sensing units each having the triboelectric generator, wherein the plurality of triboelectric generator sensing units are arranged across a predetermined area of the bottom substrate.

In an embodiment the first aspect, the plurality of triboelectric generator sensing units are arranged in a two-dimensional array.

In an embodiment the first aspect, the electronic sensing apparatus further comprises a shielding layer arranged to suppress crosstalk between adjacent triboelectric generator sensing units.

In an embodiment the first aspect, the shielding layer comprises a layer of silver disposed between adjacent triboelectric generator sensing units.

In an embodiment the first aspect, the shielding layer comprises a silver nanowire network.

In an embodiment the first aspect, the plurality of triboelectric generator sensing units are arranged to detect a deformation of a plurality of points on the predetermined area, and/or pressure mapping of an external force applied on the plurality of points on the predetermined area.

In an embodiment the first aspect, the electronic sensing apparatus is arranged to recognize an object in contact with the plurality of triboelectric generator sensing units.

In an embodiment the first aspect, the electronic sensing apparatus is arranged to operate as a human-machine interface device.

In accordance with a second aspect the present invention, there is provided a method of producing an electronic sensing apparatus, comprising the step of: coating a layer of polymer on a sandpaper having a predetermined grit size; peeling off the layer of polymer from the sandpaper after the layer of polymer is cured to form a top encapsulation layer of the electronic sensing apparatus; and attaching the encapsulation layer to a bottom substrate with at least one triboelectric generator disposed thereon, thereby encapsulating the at least one triboelectric generator; wherein the top encapsulation layer is defined with a triboelectric functional region on each of the at least one triboelectric generator, the triboelectric functional region is defined with a roughen structure defined by a plurality of micro-structures formed upon peeling off the layer of polymer from the sand paper.

In an embodiment the second aspect, the method further comprises the step of defining the triboelectric functional region using photolithography.

In an embodiment the second aspect, the step of defining the triboelectric functional region using photolithography comprises the steps of, prior to coating the layer of polymer on the sandpaper, coating a layer of photoresist on the sandpaper and patterning the layer of photoresist using photolithography.

In an embodiment the second aspect, the method further comprises a step of providing a shielding layer on the top encapsulation layer defined with a plurality of triboelectric functional regions, wherein the shielding layer comprises a layer of silver disposed between adjacent triboelectric functional regions.

In an embodiment the second aspect, the shielding layer is deposited by direct spray coating of silver nanowire on the top encapsulation layer with a shadow mask covering the triboelectric functional region on each of the at least one triboelectric generator.

The term "comprising" (and its grammatical variations) as used herein are used in the inclusive sense of "having" or "including" and not in the sense of "consisting only of".

It should be understood that alternative embodiments or configurations may comprise any or all combinations of two or more of the parts, elements or features illustrated, described or referred to in this specification.

Any reference to prior art contained herein is not to be taken as an admission that the information is common general knowledge, unless otherwise indicated. It is to be understood that, if any prior art information is referred to herein, such reference does not constitute an admission that the information forms a part of the common general knowledge in the art, in any other country.

As used herein, the term "and/or" includes any and all possible combinations or one or more of the associated listed items, as well as the lack of combinations when interpreted in the alternative ("or").

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting. Where specific integers are mentioned herein which have known equivalents in the art to which this invention relates, such known equivalents are deemed to be incorporated herein as if individually set forth.

BRIEF DESCRIPTION OF THE DRAWINGS

Details and embodiments of the indoor navigation method and system will now be described, by way of example, with reference to the accompanying drawings in which:

FIG. 15 are microscope images of (a) to (i) the inner parts of the TENG and (j) to (l) the outer parts of the TENG after 2500 cycles of beating.

FIG. 16A is an optical image of a glove with 10 TENGs integrated on different locations.

FIG. 16B is an optical image showing when a user wearing a TENGs-integrated glove holding a 200 ml beaker.

FIG. 16C is an illustration showing a distributions of OC voltage while holding the beaker as shown in FIG. 16B.

FIG. 16D is a plot showing the OC voltage of the 10 TENGs respectively while holding the beaker as shown in FIG. 16B.

FIGS. 18 and 19 are optical images and corresponding OC Voltage distribution of the sensor array mapping for by different objects, including a small resin block (1.64 g), a knife cutter (15.87 g) and a big resin block (24.63 g) respectively, from left to right.

DETAILED DESCRIPTION

The inventors, through their own research, trials and experiments, devised that to more accurate sense these information, thin, stretchable and multi-functional sensing platforms that can mimic functionalities of human skin, also known as electronic skin (E-skin) may be used as artificial skin, since E-skin may be integrated with body for in real time health monitoring with great accuracy. Similarly to other electronics, E-skin may also require integration of numerous sensors and/or actuators, which bring accompanying demands for thin, soft powering systems.

In some example embodiments, self-powered devices based on various mechanisms such as thermoelectric, piezoelectric, optielectric, magnetoelectric and triboelectric effects may be integrated into thin soft platforms and which may address soft powering problems. Among these self-powered devices, triboelectric nanogenerators (TENGs) associating with coupling of contact electrification and electrostatic induction enable converting mechanical energy into triboelectricity with simple device architectures but high power conversion efficiencies. Moreover, the electrical outputs generated by TENGs can provide power supplying for wearable devices, and may offer a sensing function such as pressure/tactile detection based on subjected mechanical forces. Advantageously, TENG-based devices may be used in various applications, such as but not limited to flexible energy harvesting, strain/stress sensing, motion recognition and position mapping.

Recent advances in engineering materials and devices that used in E-skin has been successfully implanted into TENGs for realizing tactile sensors and energy harvesters. However, the development of TENG based self-powered tactile sensors into E-skin are still facing two challenges. First, the stretchability of TENGs is still not as great as epidermal electronics based E-skin that may result in sensing signal unstable under skin deformations, and thus limits the development of TENGs into E-skin formats. Second, the signal outputs of TENGs highly depend on the effective working (contact) areas, where most reported TENGs are relatively large in centimeter or decimeter scales to dilute the electrical crosstalk problems in multiple channels sensor arrays, and therefore limit the applications in high channel counts tactile sensor arrays for high-resolution tactile recognition and mapping.

The inventors further devised that trampoline inspired mechanics design and processing techniques in epidermal electronics may be combined together to product a thin, soft, stretchable self-powered tactile sensors based on triboelectric effect for E-skin.

Figure 1A:
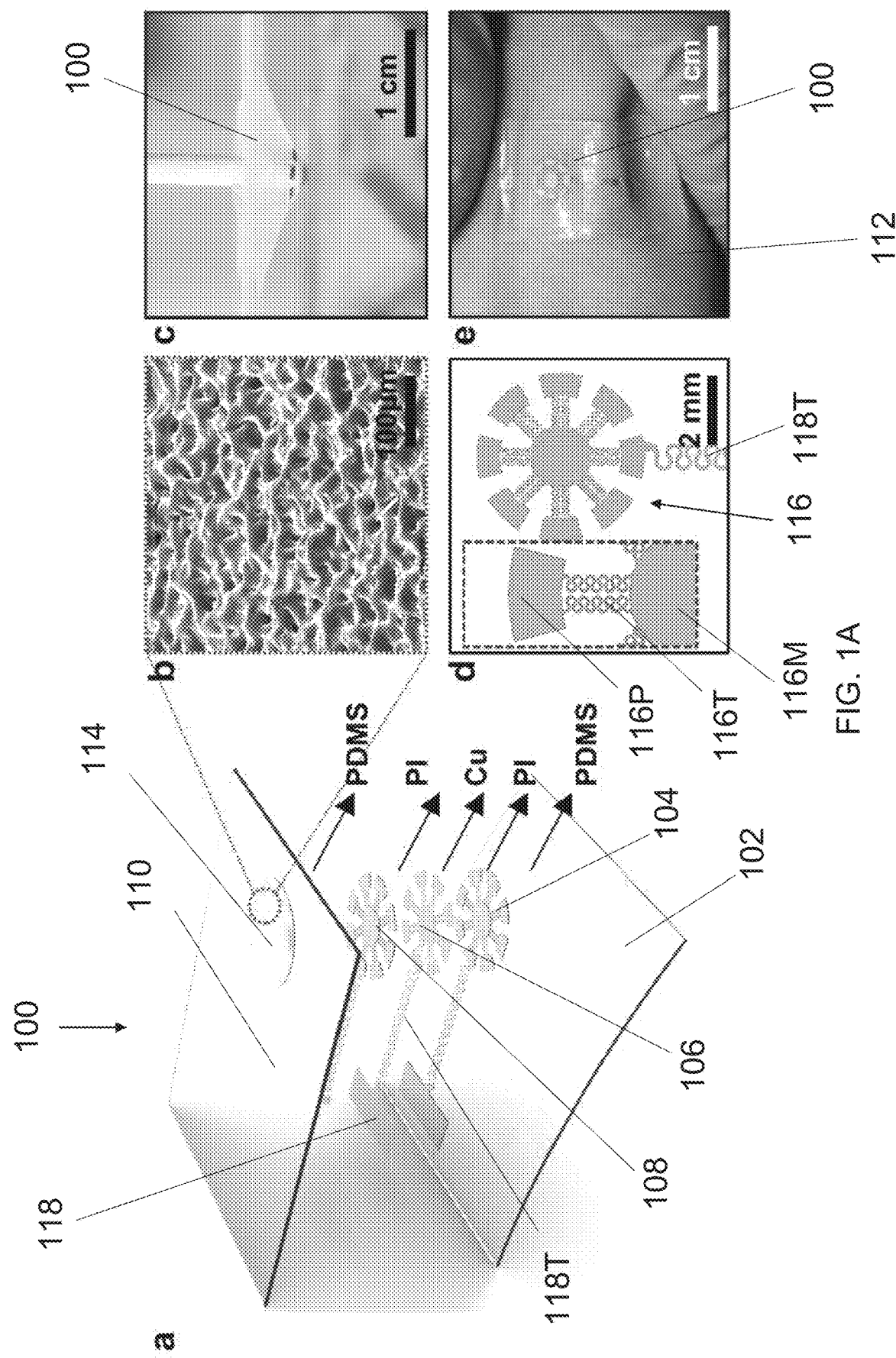
FIG. 1A is an overview of the electronic sensing apparatus, in which a) is a schematic of the electronic sensing apparatus (or "the TENG") in accordance with an embodiment of the present invention, b) is an image showing the micro-structured surface of the PDMS triboelectric region, c) is an image showing the electronic sensing apparatus under vertical poking, and the TENG deforms like a trampoline, d) is a sketch of the electrode layout and its enlarged illustration, and e) is an optical image of the TENG attached to human skin and deformed with skin.
Figure 1B:
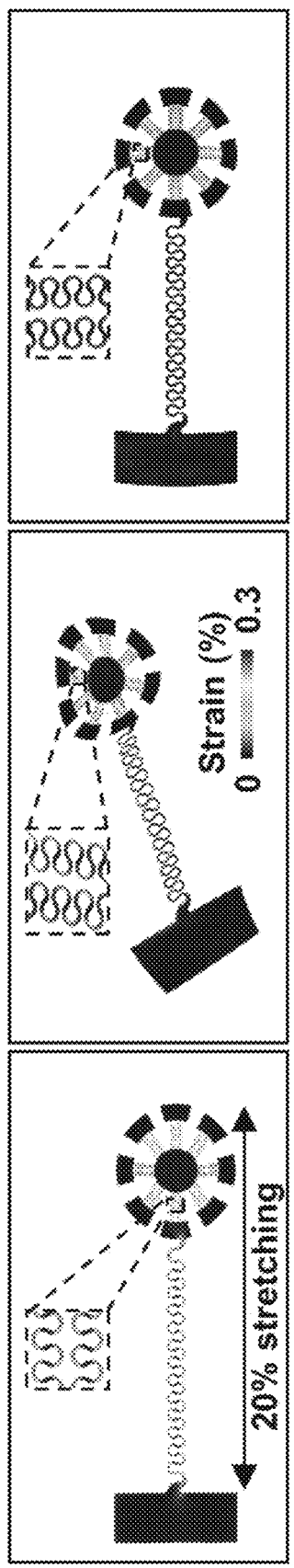
FIGS. 1B and 1C are FEA results of strain distributions and corresponding optical images of the TENG of FIG. 1A under stretching, twisting, and bending.
Figure 1C:
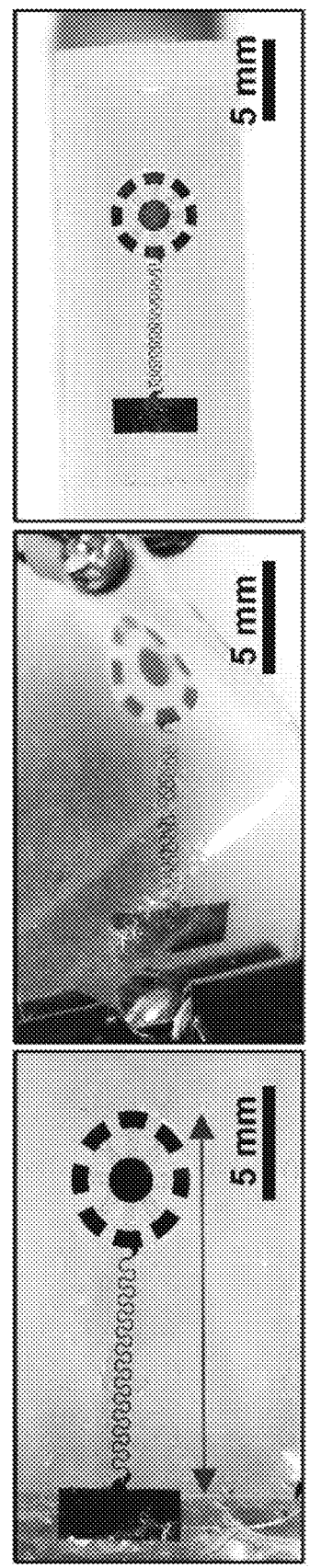

With reference to FIGS. 1A to 1C, there is provided an embodiment of an electronic sensing apparatus 100 comprising a triboelectric generator encapsulated between a bottom substrate and a top encapsulation layer, wherein the triboelectric generator is arranged to generate a triboelectric sensing signal in response to a deformation of the bottom substrate and/or the top encapsulation layer.

In this example, the electronic sensing apparatus 100 comprises from the bottom to the top, a bottom polydimethylsiloxane (PDMS) layer 102 which serves as a substrate layer, a first polyimide (PI) layer 104, a copper (Cu) electrode 106, a second PI layer 108 and a top PDMS layer 110 which serves as an encapsulation of the electronic sensing apparatus. In addition, the opposite layers of polyimide and the sandwiched Cu electrode are specifically patterned to formed the required pads/islands linked to formed like a trampoline for sensing deformation such as stretching, twisting, and bending of the bottom substrate and/or the top encapsulation layer (e.g. as shown in FIGS. 1B and 1C), or a depression of the top encapsulation layer 110 towards the bottom substrate 102 as shown in illustration (c) in FIG. 1A.

Preferably, the bottom substrate 102 and/or the top encapsulation layer 110 may be made of other flexible material such as but not limited to other types of polymer which may deform to a certain extent when being stretched, twisted, or bent. In addition, the flexible material also ensures that the entire electronic sensing apparatus is conformal to a skin surface 112 of a user (as shown in illustration (e) in FIG. 1A) when being used as an E-skin apparatus or a human-machine interface device in some alternative applications. In this example, the bottom substrate 102 is attached to the skin surface 112 by Van Der Waals forces, or alternatively may be adhered to a skin surface using suitable adhesives or gel if necessary.

In one preferred embodiment, the electronic sensing apparatus 100, also known as a stretchable TENG based single unit sensor cell or simply TENG or TENG sensor, may adopt a single electrode mode for triboelectric electricity generation. The electronic sensing apparatus includes a thin soft polydimethlsiloxane layer (PDMS; 170 μm thick, $E_{module}$~500 kPa) serves as the substrate, a photolithography-defined copper thin layer (Cu; 200 nm) supported and selectively encapsulated with two polyimide thin layers (PI; 2 μm) serves as electrode, and another PDMS layer (170 μm; $E_{module}$~1 MPa) on top of the electrode encapsulates the device.

The top PDMS encapsulation layer also serves as a functional triboelectric layer where the overlapped area (5 mm in diameter) with electrodes exhibits stomach wall featured micro-structures for enhancing the contact areas to induce more triboelectric charges. For example, referring to FIG. 1A, a circular region 114 which overlaps with the copper electrodes, i.e. the metal islands 116 as shown in illustration (d) in the Figure, which defines a triboelectric functional region for sensing the deformation of the top/bottom PDMS substrate in this region. During an operation of the electronic sensing apparatus 100, the triboelectric charges are generated at the triboelectric functional region 114 of the top encapsulation layer 110 when the triboelectric functional region 114 is in contact with an external object being electrically charged, such as human skin or an object placed on the surface of the electronic sensing apparatus 100.

Preferably, referring to the SEM image in illustration (b) of FIG. 1A, the triboelectric functional region 114 of the top PDMS layer 110 includes a roughen structure defined by a plurality of micro-structures, such as pyramid structures, which may effectively increase the surface area of the external object in contact with the top PDMS layer 110 at this region. Advantageously, the increase of effective contact area between the external object and the top PDMS layer improves generation of triboelectric charge thereby the performance, in particular the sensitivity of the TENG based single unit sensor cell, is enhanced. The operation of the electronic sensing apparatus will be described later in this disclosure.

The micro-sized pyramid like structures can be observed in this region that would provide more contact area for triboelectric effect that of a plain surface. For example, sandpapers with different grit sizes may be used as molds to create these micro-structures by directly casting PDMS on it, and the triboelectric region like frosted surfaces with various kinds of morphologies can be realized. The micro-structured PDMS thin layer exhibits considerable flexibility and stretchability, great negative-electron affinity and more effective contact areas for inducing charges, while the bottom PDMS layer serving as the substrate with lower modulus allows excellent adhesion with human skin by Van Der Waals forces.

In addition, referring to illustration (d) of FIG. 1A, the Cu electrode and the opposite layers of PI sandwiching the electrode, are patterned with a middle island 116M and eight peripheral islands 116P electrically connected with the middle island 116M via a plurality of intermediate serpentine metallic traces 116T in between, and the triboelectric functional region 114 of the top PDMS layer 110 defined by the roughen circular region covers both the middle island 116M and the peripheral islands 116P. Preferably, each of the plurality of peripheral islands 116P is connected to the middle island 116M with a pair of intermediate serpentine metallic trances 116T. During a mechanical load induced triboelectric generation process, these islands are in charge of the majority part of the electrostatic charges induction, while the serpentine traces function as stretchable springs to link all the islands into an entirety.

The electrode adopts "trampoline" styled design, where a disc in the middle (1.8 mm in diameter) and with the whole region overlapped with the micro-structured region serves as conductive layer for triboelectric induced the charges, while 16 long serpentine metallic traces (width of 100 μm) in a symmetric arrangement act as "side springs" of the trampoline and connect with the small Cu thin film island. The trampoline inspired design offers great stretchability and detection of stretches in both in-plane and out-of-plane directions.

As shown in illustration (c) of FIG. 1A, significant deformation in vertical direction didn't cause any damage to the device, which suggests that the trampoline like device may be used to detect out of plane deformations. The thickness of the TENG device is 350 μm and weighs only 0.08 g/cm$^2$, which is thin and light enough to be conformally integrated with skin by its own adhesion force without additional tapes or straps. Further referring to image (e) in FIG. 1A, it is shown a prefect skin-integration behaviors of the device, that can be deformed with skin together under twisting, bending and stretching.

With reference also to FIGS. 1B and 1C, the Cu electrode (as well as the PI layers having the same pattern with the Cu electrode) further comprises a metal pad 118 electrically connected to the middle island 116M via the peripheral islands 116P, for facilitating an output of the triboelectric sensing signal as well as indicating the stretching of the entire sensing apparatus 100. Similar to the connections between the peripheral islands 116P and the middle island 116M, the connection is preferably a serpentine metallic trace 118T, such that the triboelectric sensing signal is altered when the sensing apparatus 100, thereby also the serpentine metallic trace 118T connecting the metal pad 118 is subjected to a stretching deformation, e.g. with a different electrical voltage/current/resistance detectable by further connecting the metal pad to a controller or processor for processing the generated triboelectric sensing signal.

The stimulated strain distributions and optical images of the copper layer under three type of typical deformations, including 20% stretching, 70° twisting and bending with a radius of 5 mm are illustrated respectively in FIGS. 1B and 1C. The finite element analysis (FEA) results (FIG. 1B) indicates that under the deformations, the stimulated strains are significantly less than the copper yield strain 0.3%, which attribute to the sandwich structure of PI/Cu/PI, i.e. the copper layer is placed at the mechanical neutral plane of the serpentine wires to minimize the strain/stress in copper layer due to bending. These results under typical deformation reveals that this robust yet stretchable device can easily operate under realistic physiological loads.

In addition, corresponding to FEA results, the optical images (FIG. 1C) show that under the deformations, the electrode maintained robust structure and without any crack. The above results indicate that the design of islands-bridge layout successfully minimizes the strain level of copper electrode under various deformations, which endow the TENG electrode with the ability to integrate with the human body under daily motions.

In the experiment carried out by the inventors, FEA was utilized to optimize the electrode layout and to study the corresponding mechanical characteristics. For decreasing the strain level in copper layer under different typical loads. The PDMS was modelled by hexahedron elements (C3D8R) while the thin Cu (200 nm thick) and PI (2 μm thick) layers were modelled by shell elements (S4R). The minimal element size was ⅛th of the width of the copper wires (10 μm), which ensured the convergence and the accuracy of the simulation results. The elastic modulus (E) and Poisson's ratio (v) used in the analysis were $E_{Cu}$=115 GPa and $v_{Cu}$=0.4 for Cu; $E_{PI}$=2.5 GPa and $v_{PI}$=0.34 for PI; $E_{PDMS\_1}$=1 MPa and $v_{PDMS\_1}$=0.5 for top PDMS; $E_{PDMS\_2}$=70 kPa and $V_{PDMS\_2}$=0.5 for bottom PDMS.

Figure 2:
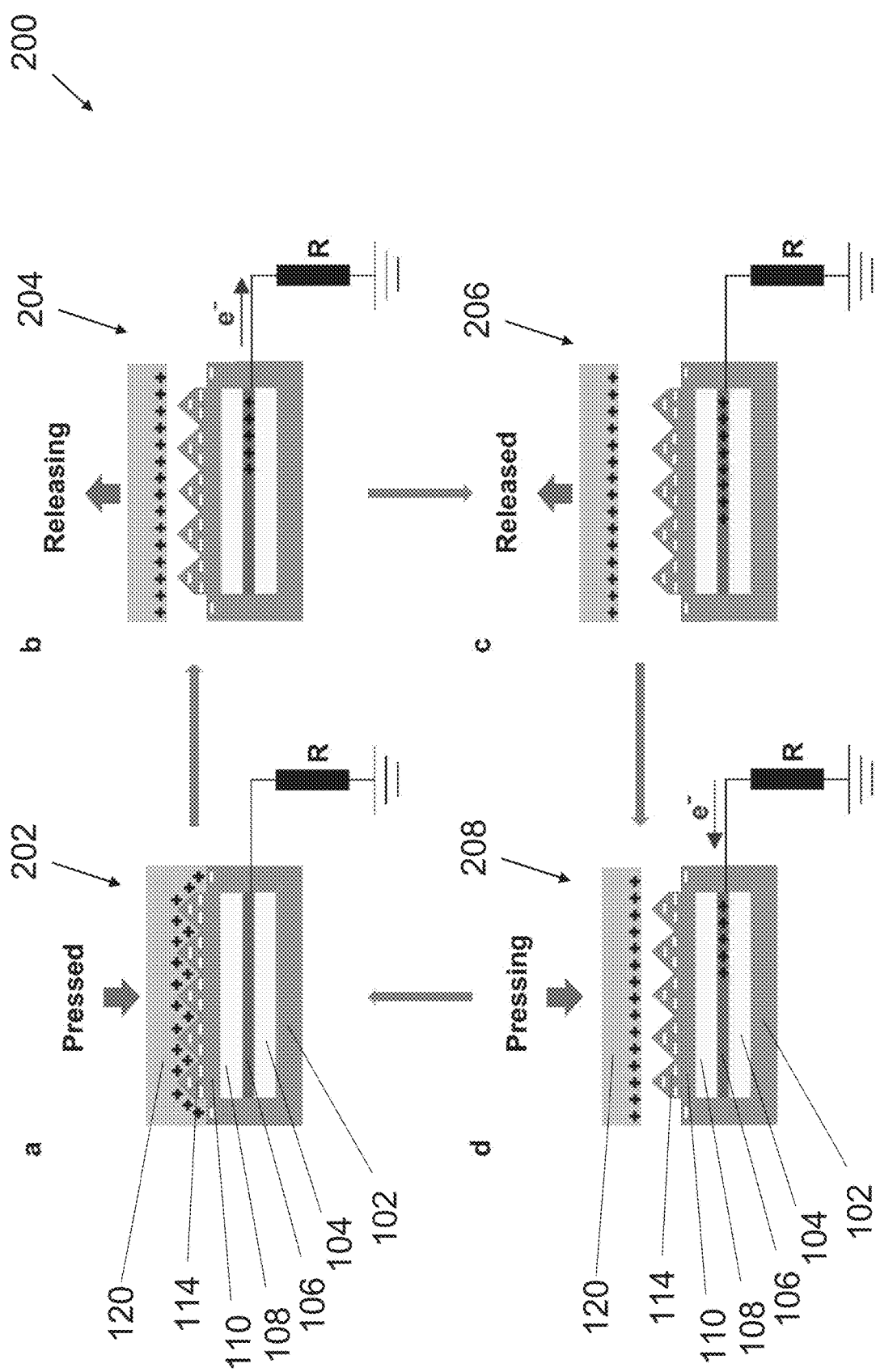
FIG. 2 is an illustration showing a working principle of the TENG sensor of FIG. 1A.

Referring to FIG. 2, there is shown an example operation 200 of the electronic sensing apparatus, such as when the triboelectric functional region 114 being repeatedly pressed and released by a fingertip 120 of a user of the electronic sensing apparatus 100. In this example, triboelectric charges are generated at the triboelectric functional region 114 of the top encapsulation layer 110 when the triboelectric functional region 114 is in contact with a skin surface of fingertip 120 which is positively charged. Effectively, skin of the fingertip 120 and the micro-structured region 114 of the top PDMS layer 110 serve as positive and negative triboelectric layers, respectively. In step 202, when the finger 120 touched the triboelectric region 114, the skin partially deformed by the roughen structures and morphologically approaching with the uneven surface of the triboelectric region 114, result in larger contact area for more charges generation that of contacting with a plain PDMS surface, and the microstructured PDMS film that was pressed by finger generated the same amount of negative and positive charges.

In step 204, when the finger 120 leaves the PDMS surface and the electrode 106 is charged positively by losing electron to the ground, therefore triboelectric sensing signal is generated when the copper electrode is charged by the electrically charged triboelectric functional region 114, upon the external object (in this example, the finger 120) separates from the triboelectric functional region 114 of the top encapsulation layer 110. In step 206, the electric potential difference reaches maximum when the gap between the skin and PDMS film reaches the maximum separation. In step 208, when the finger 120 presses the TENG again, the gap decreases, and the electrode 106 is charged negatively by gaining electron from the ground, and the operation returns to step 202 in which the roughen structure deforms the skin surface in contact with the plurality of micro-structures on the triboelectric functional region 114 thereby increasing an effective contact area between the skin surface and the top encapsulation layer 110 at the triboelectric functional region 114.

Figure 3:
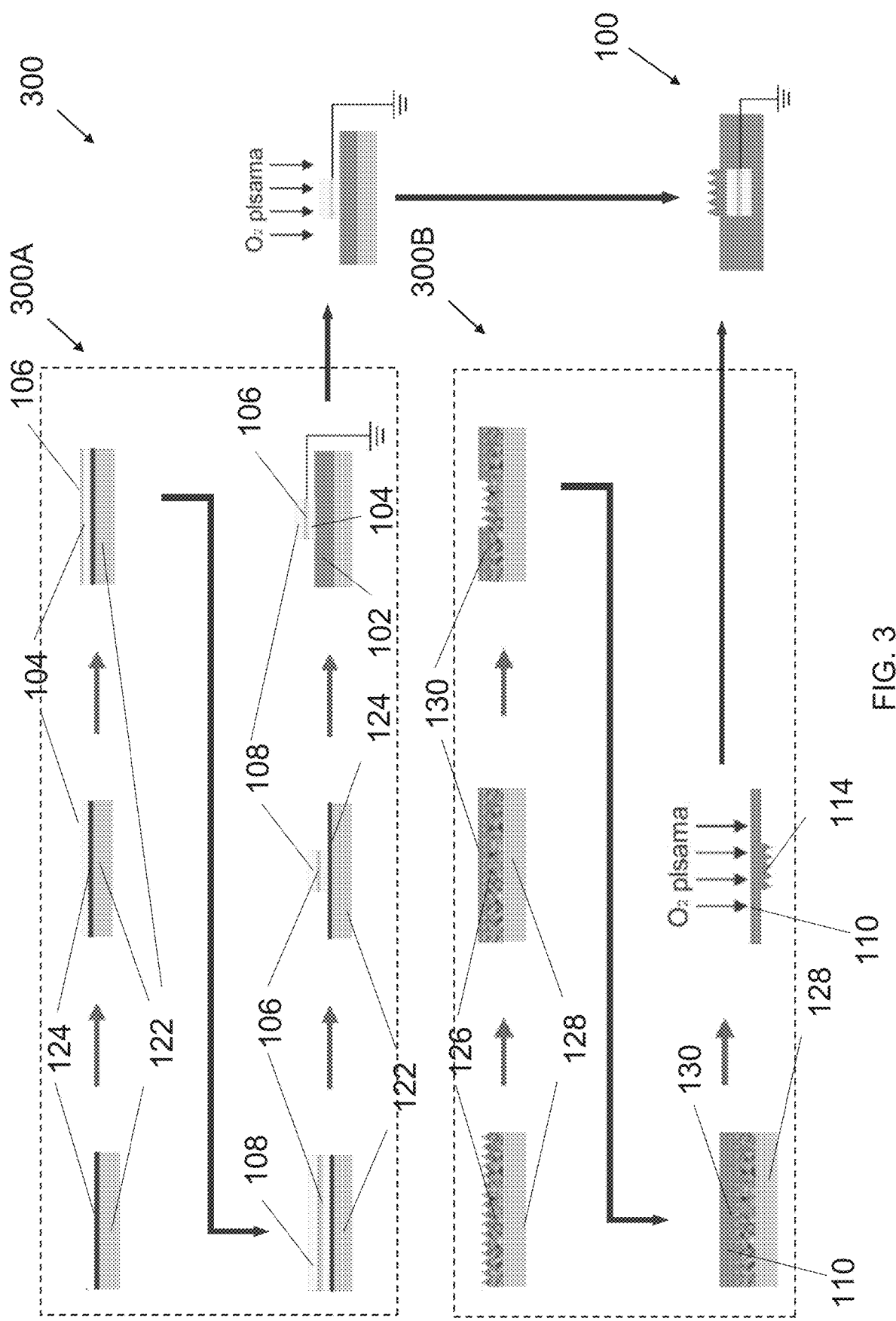
FIG. 3 is an illustration showing a fabrication process of the electrode pattern, the top PDMS layer and the final integration of TENG.

With reference to FIG. 3, there is shown an embodiment of a method 300 of producing the electronic sensing apparatus 100, comprising the step of coating a layer of polymer on a sandpaper having a predetermined grit size; peeling off the layer of polymer from the sandpaper after the layer of polymer is cured to form a top encapsulation layer of the electronic sensing apparatus; and attaching the encapsulation layer to a bottom substrate with at least one triboelectric generator disposed thereon, thereby encapsulating the at least one triboelectric generator; wherein the top encapsulation layer is defined with a triboelectric functional region on each of the at least one triboelectric generator, the triboelectric functional region is defined with a roughen structure defined by a plurality of micro-structures formed upon peeling off the layer of polymer from the sand paper.

The fabrication may start by a fabrication of the conductive layer in method 300A. For example, in step 302, the fabrication starts on a pre-cleaned glass substrate 122, 20 mg/ml Poly(methylmethacrylate) (PMMA) solution is first spin-coated at 2000 rpm for 60 s on the glass, then cured on a hotplate at 200° C. for 20 min, serving as the sacrificial layer 124. In step 304, poly-amic acid solution (12.0 wt %±0.5 wt %) is spin-coated onto the PMMA layer at 3000 rpm for 30 s and then baked on a hotplate at 250° C. for 30 min to form a 2 μm thick PI film 104. Afterward, in step 306, a 200 nm copper film 106 is sputtered onto the PI layer, followed by spin-coating a 2 μm PI layer 108 onto it in step 308 that used the same procedure of the previous PI layer in step 304.

In step 310, the trampoline pattern (i.e. the metal island, the peripheral islands, the metal pad and the serpentine metallic trace) of the Cu electrode and the PI layers is formed through photolithography method: A layer of AZ4620 photoresist (PR, AZ 4620, AZ Electronic Materials) is spin-coated at 3000 rpm for 30 s on the surface of the top PI layer 108, then soft baked on a hotplate at 115° C. for 5 min, exposed to ultraviolet light for 45 s with a mask aligner (URE-2000/35AL deep UV, IOE, CAS), developed in AZ 400K developer, followed by post-bake at 115° C. for 5 min, then the desired pattern is formed on the photoresist. Then, in step 312, the top PI layer 108 is selectively etched through reactive ion etching (RIE, Oxford Plasma-Therm 790 RIE system, 200 W, 10 min), followed by wet etching the exposed Cu thin film 106 in Cu etchant and then rinsed by DI water and dry air below dried, and then followed by another process of dry etching of the bottom PI layer 104. Then, the remained PR layer is stripped by acetone, and finally the desired electrode pattern with sandwich structure (PI/Cu/PI) is realized. In addition, the PI on the rectangle part of the electrode pattern (the metal pad 118) is selectively etched by RIE again, exposing the copper layer for subsequent connection with copper wire.

In step 312, the glass substrate with the patterned PI/Cu/PI layers are immersed in acetone for 12 h until the PMMA layer 124 was completely dissolve, then a water-soluble tape (WST) acting as a stamp was attached to the pattern tightly and picked electrode up. A polydimethylsiloxane (PDMS) substrate 102 (spin-coating speed: 600 rpm, 30 s) and the electrode-attached WST are exposed to UV induced ozone together for 10 min, to create chemical groups for bonding between the bottom PI layer 104 of electrode and PDMS substrate 102. The electrode is then transfer printed through tightly attaching the WST to the PDMS substrate 102, followed by heating them in an oven at 90° C. for 10 min to further enhancing the bonding strength. Then the WST-attached PDMS is immersed in water to remove the WST, leaving the electrode integrated onto the PDMS substrate 102 tightly, which served as conductive layer and substrate respectively. Finally, the exposed copper part of the metal pad 118 may be connected with a copper wire by silver paste or any suitable wire bonding method.

On the other hand, the fabrication of the triboelectric layer, or the top PDMS encapsulation layer 110 with the triboelectric functional region 114, may be fabricated following the example process 300B with reference to FIG. 3. Preferably, sandpapers as molds for microstructure duplicating, which comprises a step of coating a layer of photoresist on the sandpaper and patterning the layer of photoresist using photolithography to define the triboelectric functional region on the PDMS polymer layer, then coating PDMS on the sandpaper and peeling off the cured PDMS layer to obtain a layer of PDMS layer with the microstructures defined in the triboelectric functional region.

For example, referring to FIG. 3, there is shown an example process 300B which outlines a process of forming a PDMS top layer 110 with a micro-structured region serving as negative triboelectric layer. First, in step 322, a piece of sandpaper 126 is pre-cleaned with acetone, ethanol, and deionized water (DI water) in sequence, and then fixed onto the surface of a glass substrate 128. Then, in step 324, a photolithography process is carried out as mentioned before: the PR layer 130 is formed through spin-coating (800 rpm, 30 s) for twice to completely cover the surface of the sandpaper 126, and then a UV exposure is applied for 4 min followed by PR developing. Then the mold for microstructure patterns was obtained in step 326.

Next, PDMS was prepared and placed in vacuum environment for 30 min to remove air bubbles, and in step 328, the PDMS is spin coated onto the microstructure mold at 600 rpm for 30 s, then is placed them in vacuum environment to sock the bubbles again. The PDMS coated sandpaper 126 is then placed in an oven and the PDMS layer 110 is cured at 70° C. for 1 h, the micro-structured pattern is then formed below the PDMS layer 110. Since the PDMS has weak adhesion with PR and SiC particle of the sandpaper, the micro-structured PDMS layer 110 may be easily peeled off from the mold. The PDMS top layer 110 with a micro-structured region 114 (5 mm in diameter) is obtained.

Lastly, the fabrication process 300 is complete by integration and assembly of the TENG, after treating the fabricated top PDMS encapsulation layer 110 and the bottom PDMS layer 102 with the patterned PI/Cu/PI layers by $O_2$ plasma for 3 min in step 330, the back side of the triboelectric layer and the electrode-attached substrate were attached firmly together (the position of the micro-structured region 114 was vertically corresponding to electrode pattern, i.e. the islands), finally the self-powered tactile sensor 100 is assembled in step 332.

Figure 4A:
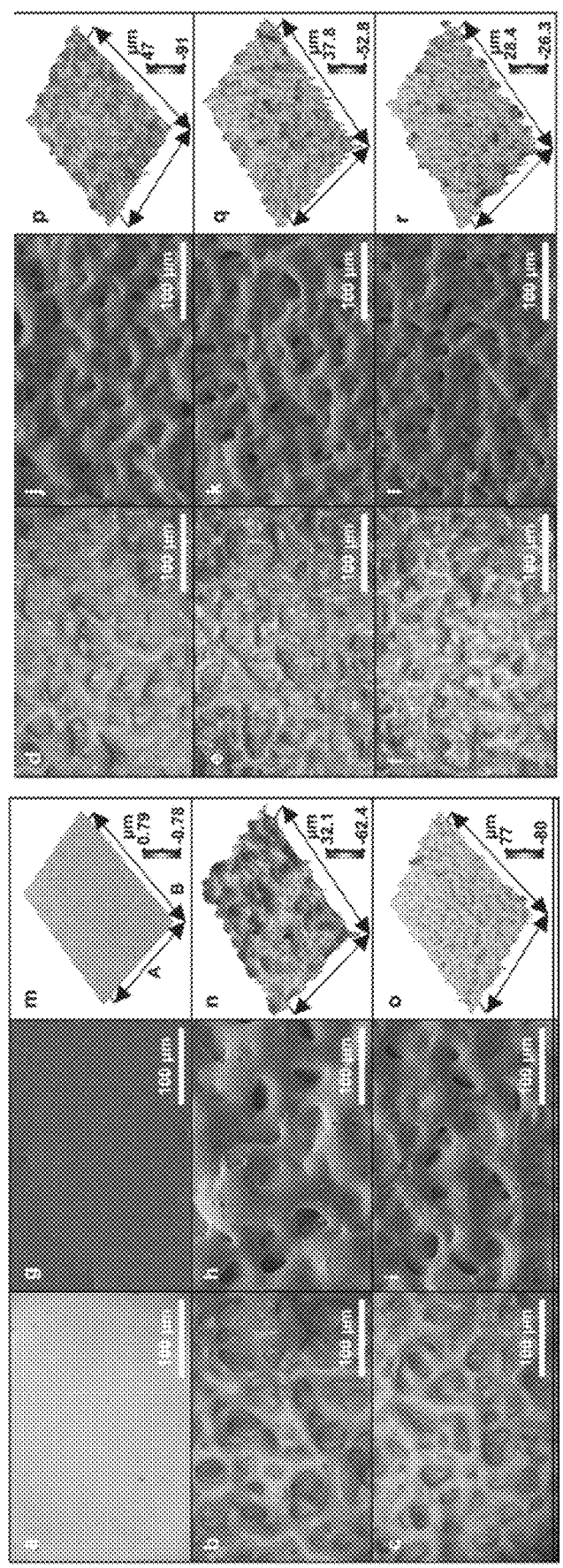
FIG. 4A are optical images, SEM images and topographies of the plain PDMS surface, and those patterned with sandpapers of 400, 600, 800, 1000, 1200 respectively.
Figure 4B:
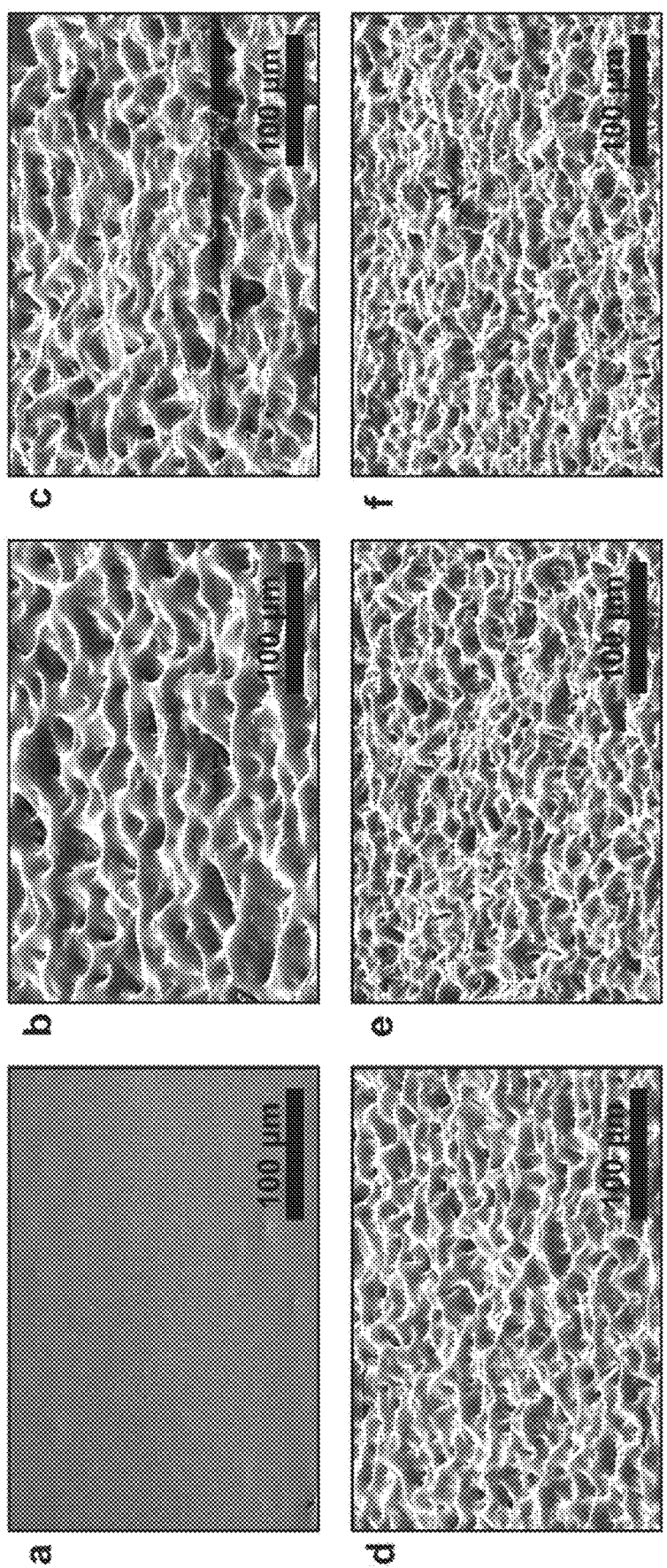
FIG. 4B is another set of SEM images of PDMS surface, in which (a) is plain, (b) to (f) are patterned with sandpapers of 400, 600, 800, 1000, 1200, respectively.

With reference to FIG. 4A, there is shown different surface morphologies of PDMS with/without microstructure. The results are shown in the images a) to f) which are optical images, images g) to l) which are SEM images and 3D plots m) to r) showing topographies of the plain PDMS surface, and those patterned with sandpapers of 400, 600, 800, 1000, 1200 respectively (the topographies of corresponding samples were measured by the optical surface profiler (A: 671.0 μm, B: 896.4 μm)). Another set of SEM images of topographies of the different PDMS surface is included for comparison, referring to FIG. 4B The inventor devised that morphologies and microstructures of triboelectric layers in TENGs may be a key issue for electrical performance as which can result in different contact electrification effects. The microstructures in the PDMS triboelectric layers may be created by sandpapers, so various sandpapers with different grit sizes, ranging from 400 to 1200 and the resultant microstructures and electrical performance difference in PDMS triboelectric layers were studied. As a reference, plain PDMS without any microstructure modifications was also studied as a bench mark.

In this experiment, it is observed that the plain PDMS thin layer casted by spin-coating is quite smooth with an average root mean square (rms, $R_{rms}$) of 28.12 nm. Toward the patterned group, the particle-distributed microstructures were perfectly duplicated from sandpapers to PDMS surfaces. With the grit size increasing, the microstructures on PDMS surface become smaller and denser, resulting in roughness decrease, specifically, $R_{rms}$=11.98 μm for grit size-400 to $R_{rms}$=7.14 μm for grit size-1200. The results are also summarized in the following table.

| | Mesh number | | | | | |
|---|---|---|---|---|---|---|
| | plain | 400 | 600 | 800 | 1000 | 1200 |
| Particle size | / | 35.0 μm | 25.8 μm | 21.8 μm | 18.3 μm | 15.3 μm |
| Ra | 19.64 nm | 9.72 μm | 8.59 μm | 7.31 μm | 6.99 μm | 5.71 μm |
| Rq | 28.12 nm | 11.98 μm | 11.07 μm | 9.21 μm | 8.84 μm | 7.14 μm |

Next, the relationship between the electrical performance of TENG devices and the microstructures formed from different grit sized sandpapers was studied to clarify the most optimized parameters. The TENG devices studied here work through the contact-separation between the triboelectric region and the external contact object, which serve as negative and positive triboelectric layers, respectively. For the purpose of developing self-powered tactile sensors, fingers and some daily used objects are the most relevant contact objects that couple with the triboelectric region in TENGs. The open-circuit (OC) voltage and short-circuit (SC) current were systemically characterized via a self-built mechanical loading machine.

Figure 5:
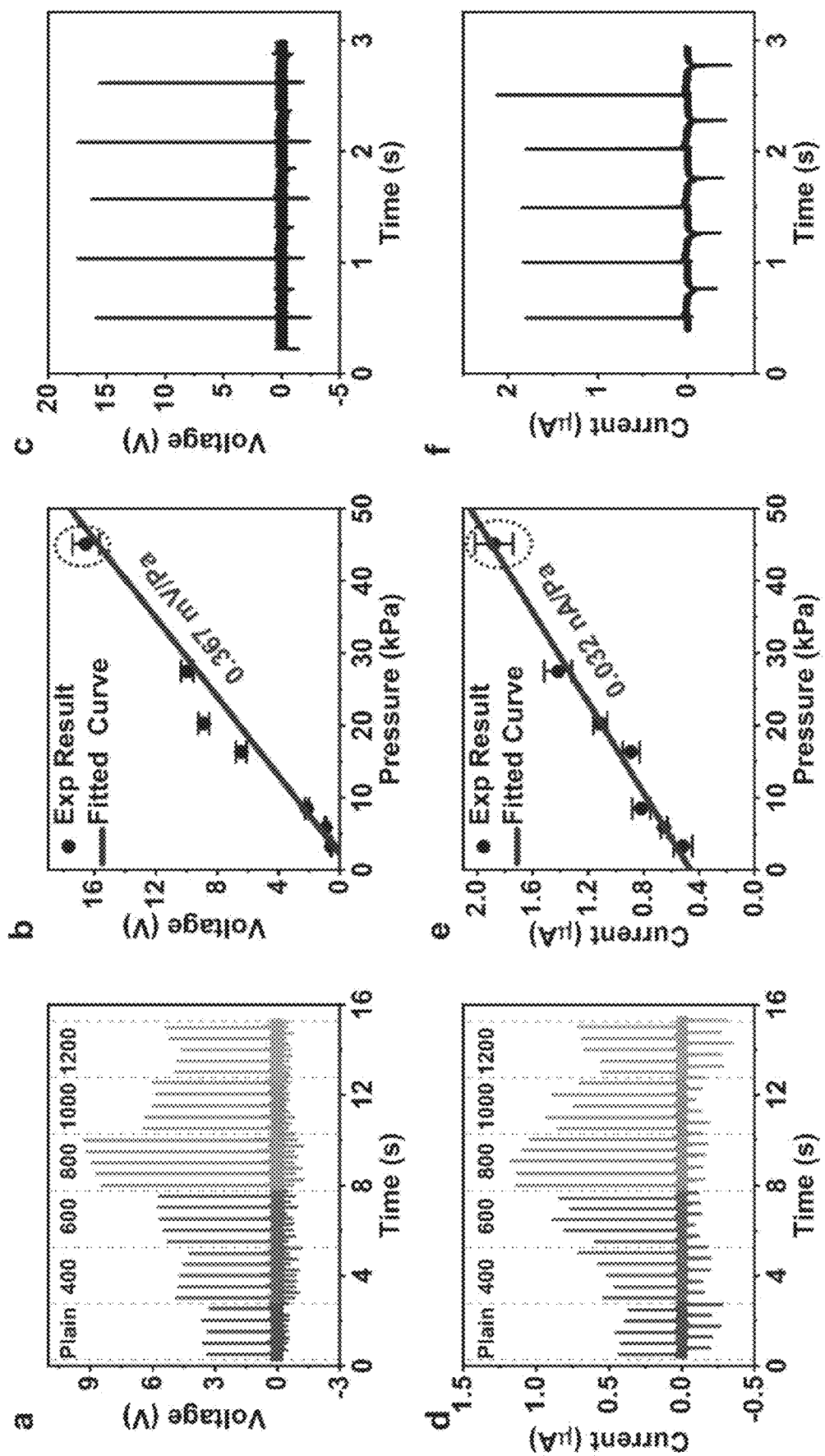
FIG. 5 are plots showing the electrical characteristics of the TENG of FIG. 1A FIG. 6 are optical images of TENG of FIG. 1A under strains along (a) to (e) x axis and (f) to (j) y axis in different levels.

As described earlier, with reference to FIG. 2, when a finger touched the triboelectric region, the skin partially deformed and morphologically approaching with the uneven surface of the triboelectric region, result in larger contact area for more charges generation that of contacting with a plain PDMS surface. As further illustrated in FIG. 5, under a periodical pressure of ~20 kPa at a frequency of 2 Hz, the OC voltage (plot a) and SC current (plot d) in TENGs as a function of grit sizes present an interesting variation trend. First, all the microstructures patterned devices exhibit greater electrical signal outputs that of the plain group. The OC voltage and SC current are only 3.43±0.14 V and 0.41±0.04 μA for the plain PDMS based devices, while the patterned group shows OC voltage and SC current of 4.60±0.24 V and 0.56±0.10 μA for devices with grit sizes of 400, 8.88±0.35 V and 1.11±0.05 μA for devices with grit sizes of 800.

However, further increase the grit sizes causes outputs deterioration, with 6.12±0.25 V and 0.82±0.09 μA for grit sizes of 1000, and 4.97±0.29 V and 0.63±0.08 μA for grit sizes of 1200. Lower grit sizes enhancing performance can be easily understood as the increase of effective triboelectric contact area, however, higher grit sizes caused performance deterioration is because the concave holes/cavities are too small to provide effective areas. It is clear that the microstructures produced by sandpaper of 800 grit size offer the most preferable magnification of contact electrification effect, so devices patterned by 800 grit size was selected for more detail tests and demonstrations.

Referring to plots b and e, there is shown the OC voltage and SC current of the 800 grit sized sandpapers modified TENG devices as a function of various applied stress, ranging from ~3 kPa to ~45 kPa at a fixed frequency of 2 Hz. The resulting outputs were measured to be 574.66±0.03 mV and 0.52±0.07 μA and 16.55±0.88 V and 1.88±0.14 μA, at a very gentle touching force of 3.27 kPa and a more solid touching force of 45.1 kPa, indicating the great capability for sensing various types of touching with different stress. The TENG device also presents a great linearity with applied stress for both the OC voltage and SC current outputs, with a sensitivity of 0.367 mV/Pa. The great sensitivity and linearity of signal outputs allows the soft TENG devices well distinguishing the pressure/stress in a broad range.

Representative plots of signal outputs in the TENG vs time are shown in plots c and f, revealing repeatable and stable time dependent waveforms, demonstrating considerable and constantly stable output amplitudes. In view of the above excellent electrical performance, the TENG devices are capable of tactile sensing for activities in human's in daily life.

Figure 6:
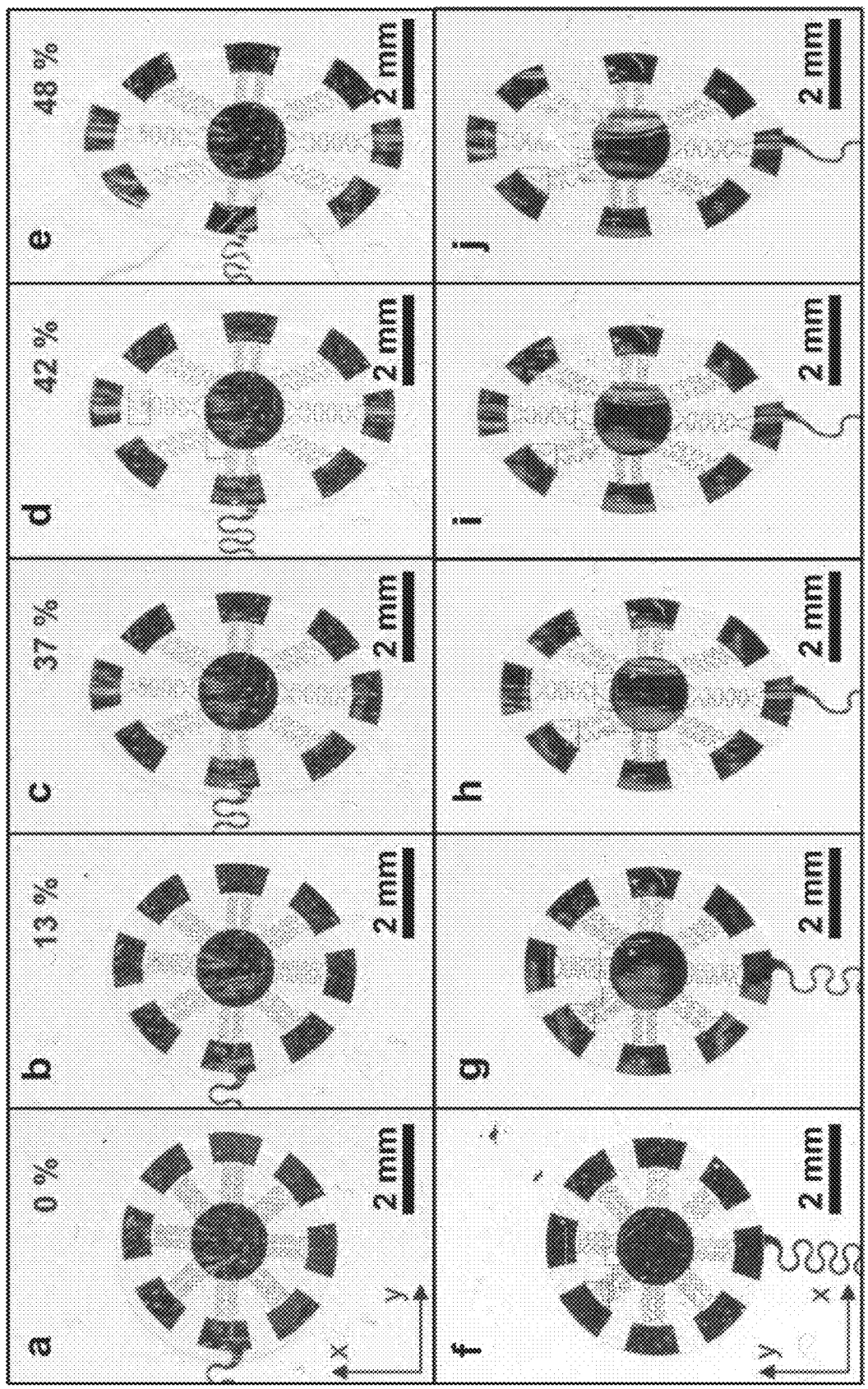

The inventors also devised that normal daily activities related strain levels of human skin could be up to 20%~30%, thereby the skin-integrated sensors that can undertake the corresponding strains are of great significance. Here axial and dual-directional stretchability test of the TENG based sensors were carried out by a self-built stretching stage. The strain level is defined as the ratio of changing length to the original length of the electrode. With reference to FIG. 6, the device shows similar deformation feature under strain levels from 0% to 48% in either x axial or y axial strain, since the device adopts a symmetrical design.

Figure 7:
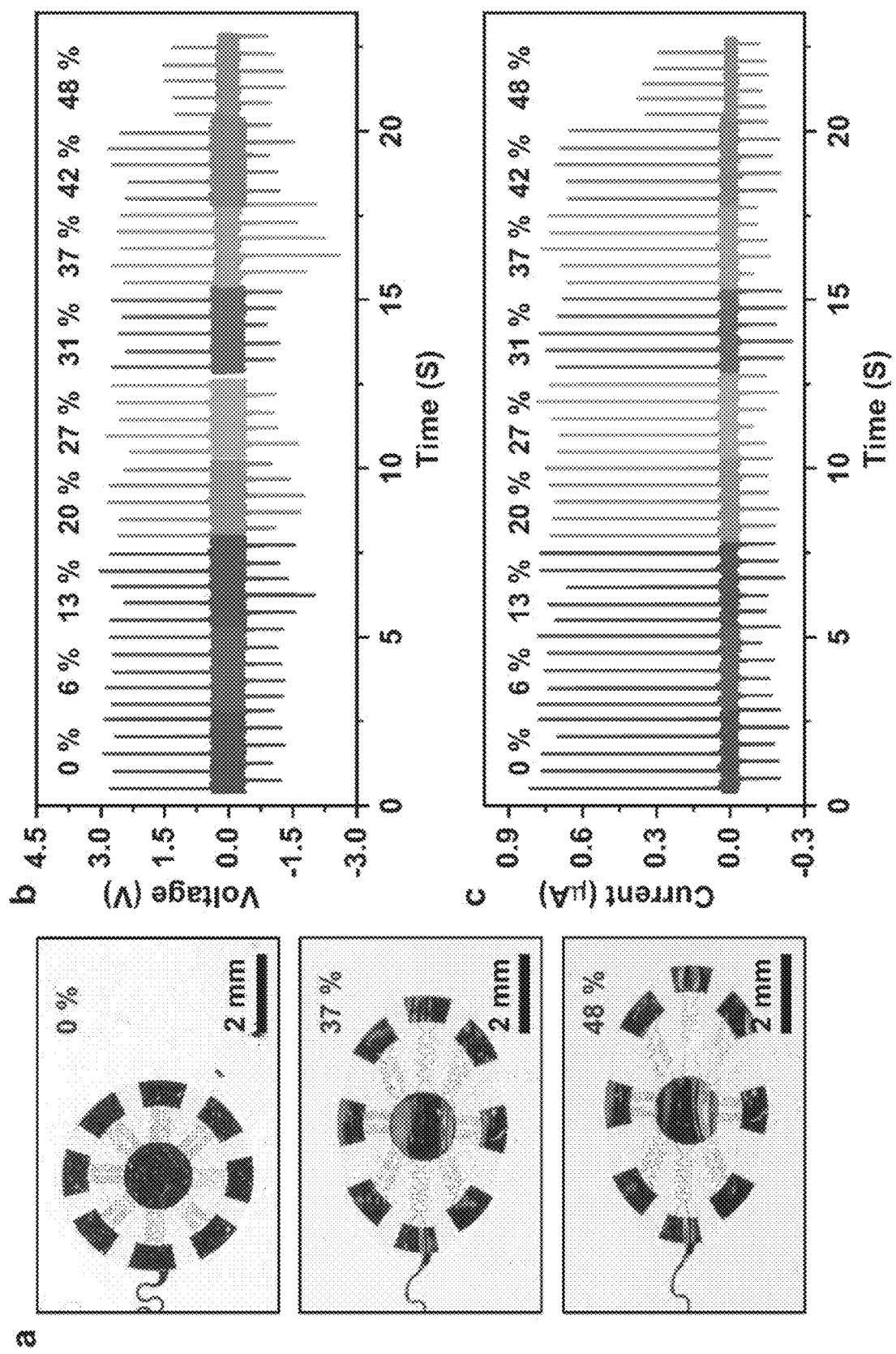
FIG. 7 shows a stretchability test of the TENG, in which a) are optical images of the TENG under 0%, 37%, and 48% strain, b) and c) are plots showing the OC voltage and corresponding SC current of the TENG as function of various strain levels from 0% to 48%, under constant stress of 9.42 kPa at frequency of 2 Hz.
Figure 8:
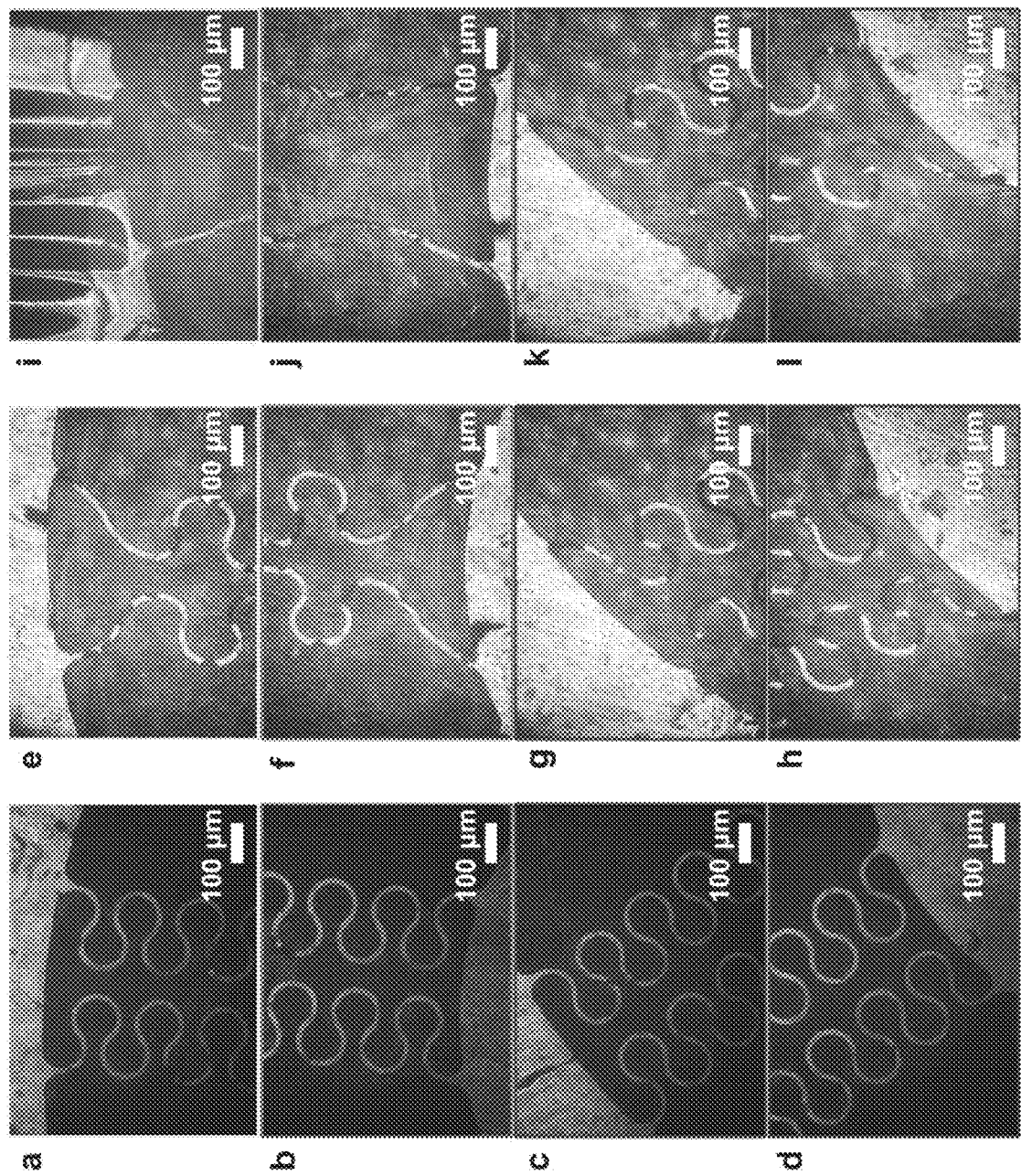
FIG. 8 are microscopic images of the interconnects between islands and traces under y axial strain of (a) to (d) 0%, (e) to (h) 37% and (i) to (l) 48%.
Figure 9:
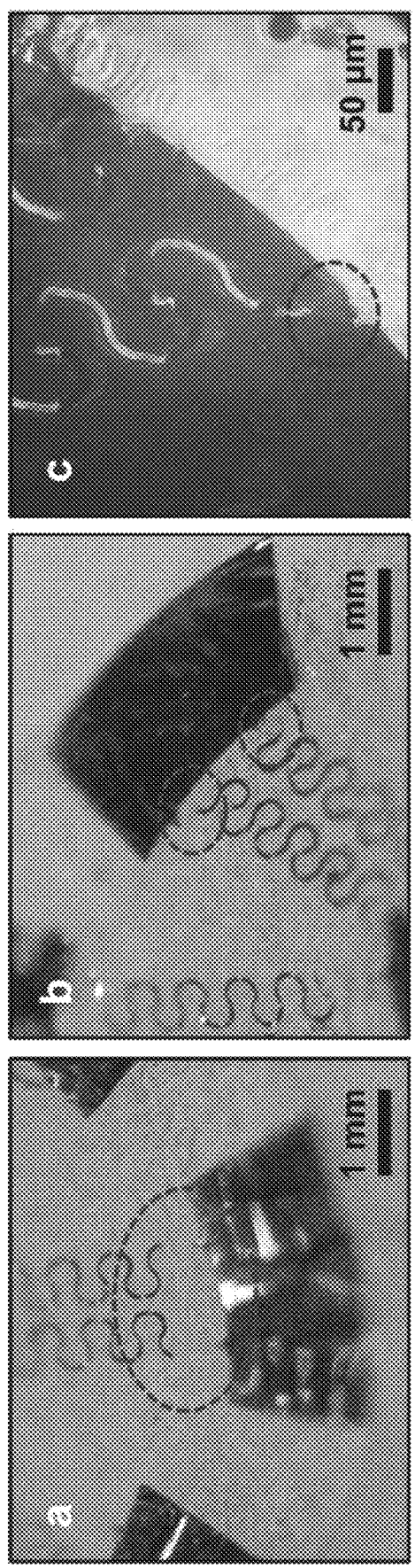
FIG. 9 are microscopic images showing cracks occurred on the interconnects between serpentine traces and islands, under strain of 48%.

Referring to FIGS. 7 and 8, which show the photos and the microscope captured images of a representative TENG sensor under y axial strains of 0%, 37% and 48%, it was observed that the deformations are in great agreement with strain distributions stimulated by FEA (FIG. 1B). Some visible fracture failures may occur in the interconnects between islands and serpentine bridges under strain above 42% (e.g. FIG. 8: images d and e and FIG. 9). Plot b of FIG. 7 shows the OC voltage and SC current of the TENG as a function of various strain levels ranging from 0% to 48%, under a constant pressure of ~9 kPa at frequency of 2 Hz. It can be seen that the TENG sensor can maintain almost unchanged electrical outputs up to 42% stretching, while the output signals deteriorated under further stretching to 48%, due to the broken of the serpentine traces.

Figure 11:
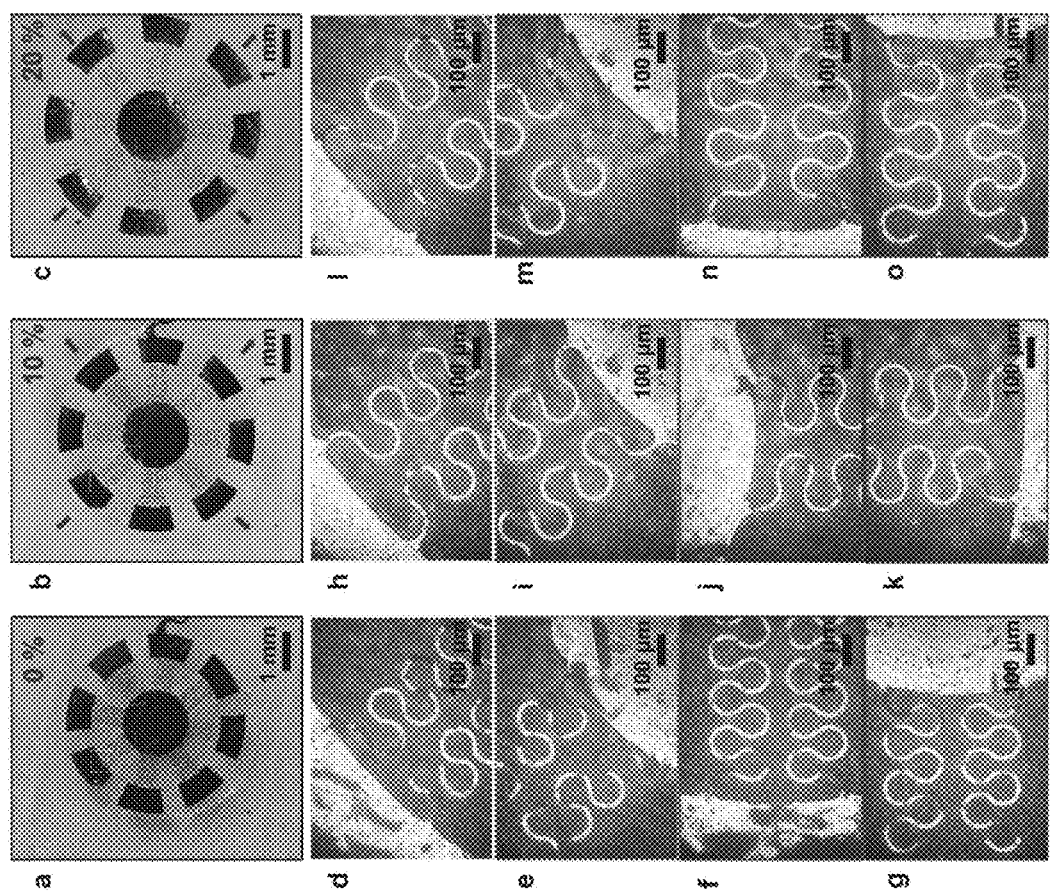
FIG. 11 are optical images of the TENG and the interconnects under dual-directional strain of (a), and (d) to (g) 0%, (b) and (h) to (k) 10% and (c) and (l) to (o) 20%.
Figure 10:
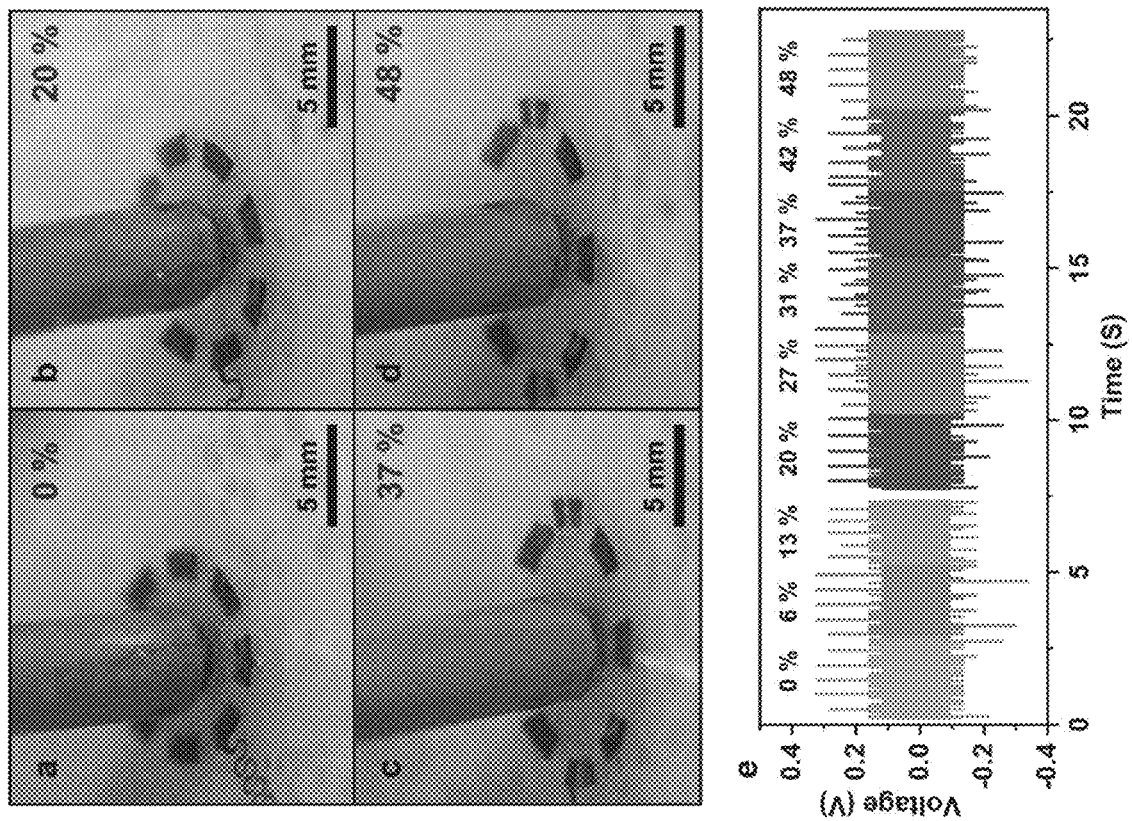
FIG. 10 shows an out-of-plane deformation experiment, in which (a) to (d) are images showing a bamboo stick (diameter: 2 mm) poked to the position of the central island, under strain of 0%, 20%, 37% and 48% respectively, with a force of 2.74 N at frequency of 2 Hz, and (e) is a plot showing the corresponding OC voltage induced from the central island in electrode with strain of 0% 48%.
Figure 12:
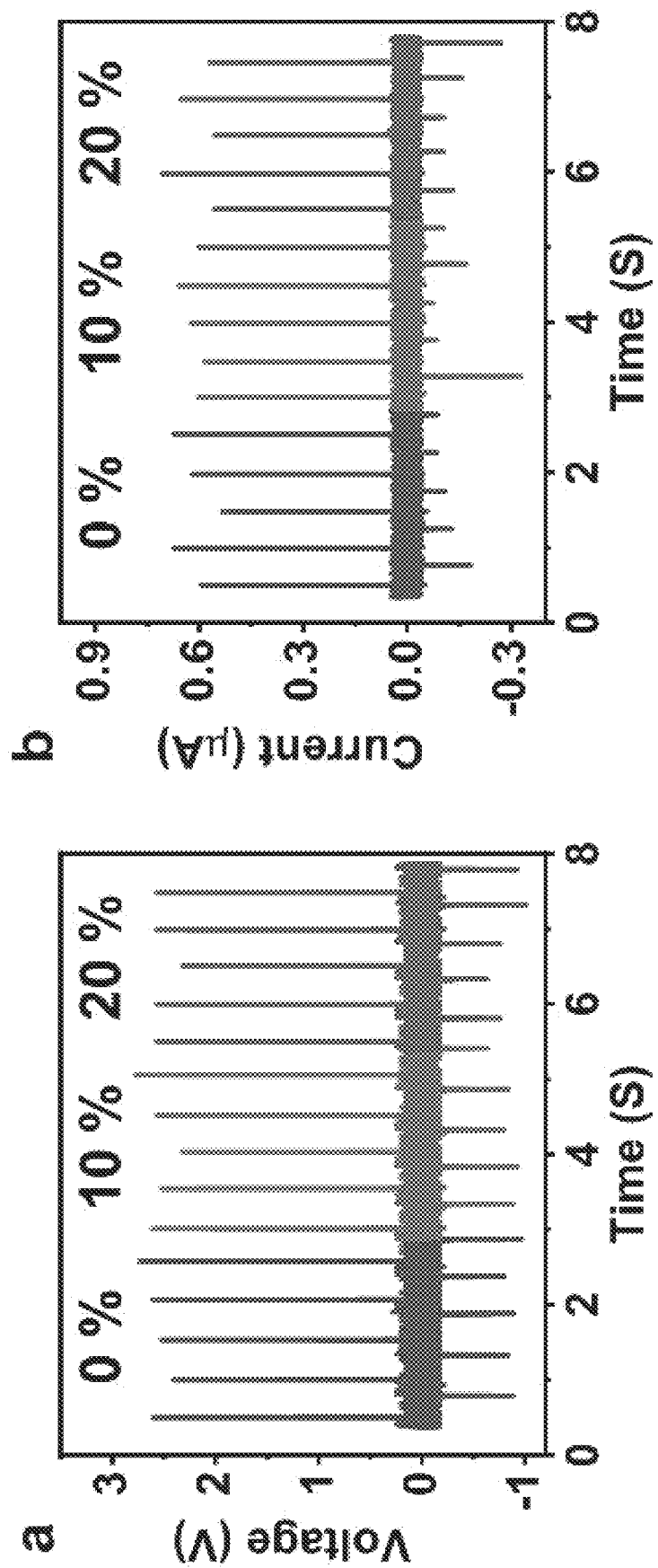
FIG. 12 are plots showing respective OC voltage and SC current by TENG as function of dual-directional strain.
Figure 13:
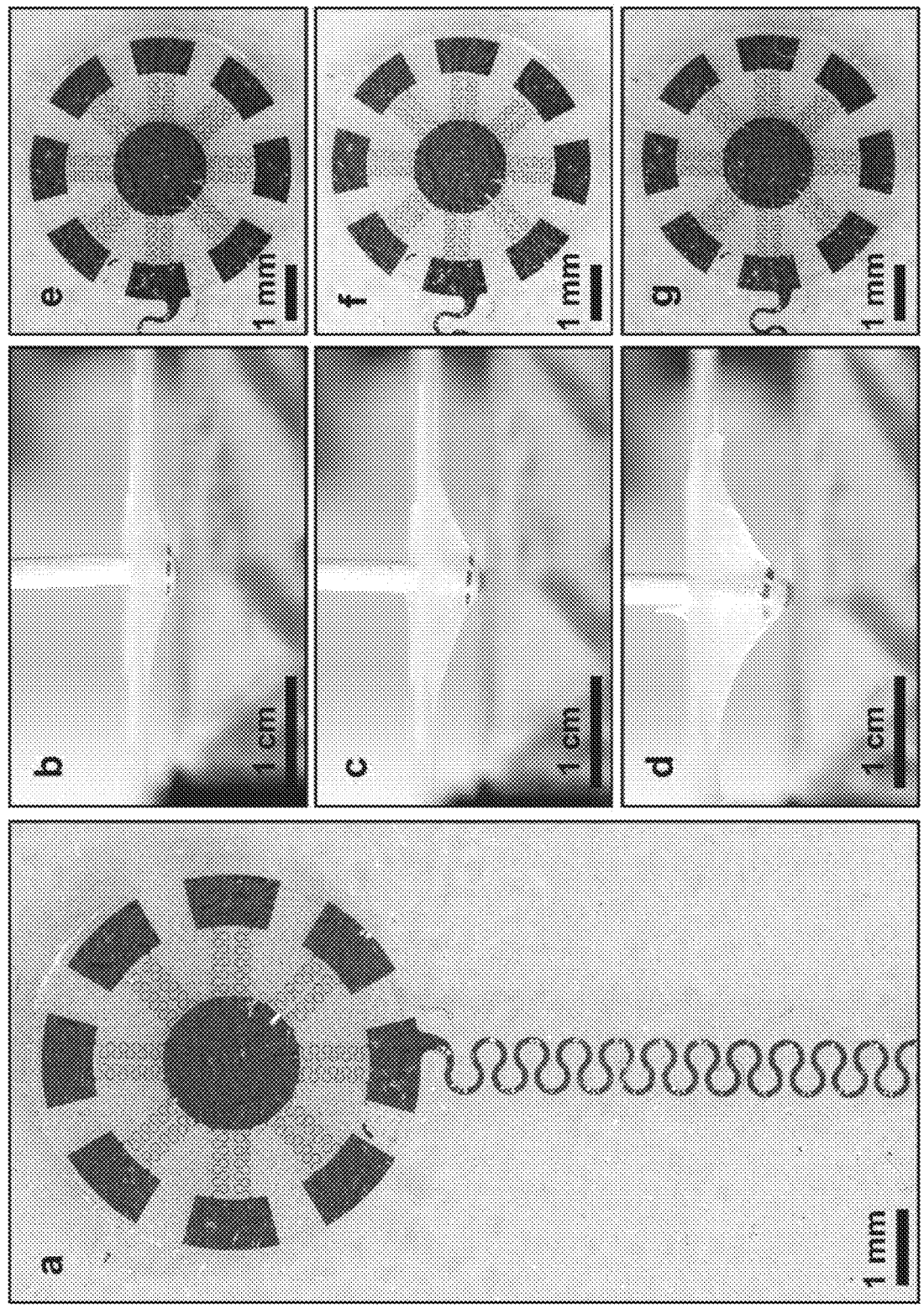
FIG. 13 are images showing the poking test, in which (a) shows the view of the TENG before poking, (b) to (d) are side view of the TENG under vertical poking with different degrees, the TENG depressed with depth of 3 mm, 5 mm and 7 mm respectively, (e) to (g) show the TENG recovered to its original state after poked with different degrees.

With reference to FIG. 10, the inventors also tested the performance of the sole center island in the device by using a bamboo stick, the results shown in plot e indicate that the islands could perform electrostatic induction independent of trace straightening until all the traces fracture. Similarly, the TENG could perform durable output and maintain great robust structure even under dual-directional stretching of ~20% (FIGS. 11 and 12), with a hard vertical poking to the depth up to 7 mm (FIG. 13). These comprehensive experiments show the excellent stretchability of the trampoline inspired TENGs for 3 dimensional deformations, that can eliminate the undesired influence and coupling issues induced by either in-plane or out-plane stretching.

Figure 14:
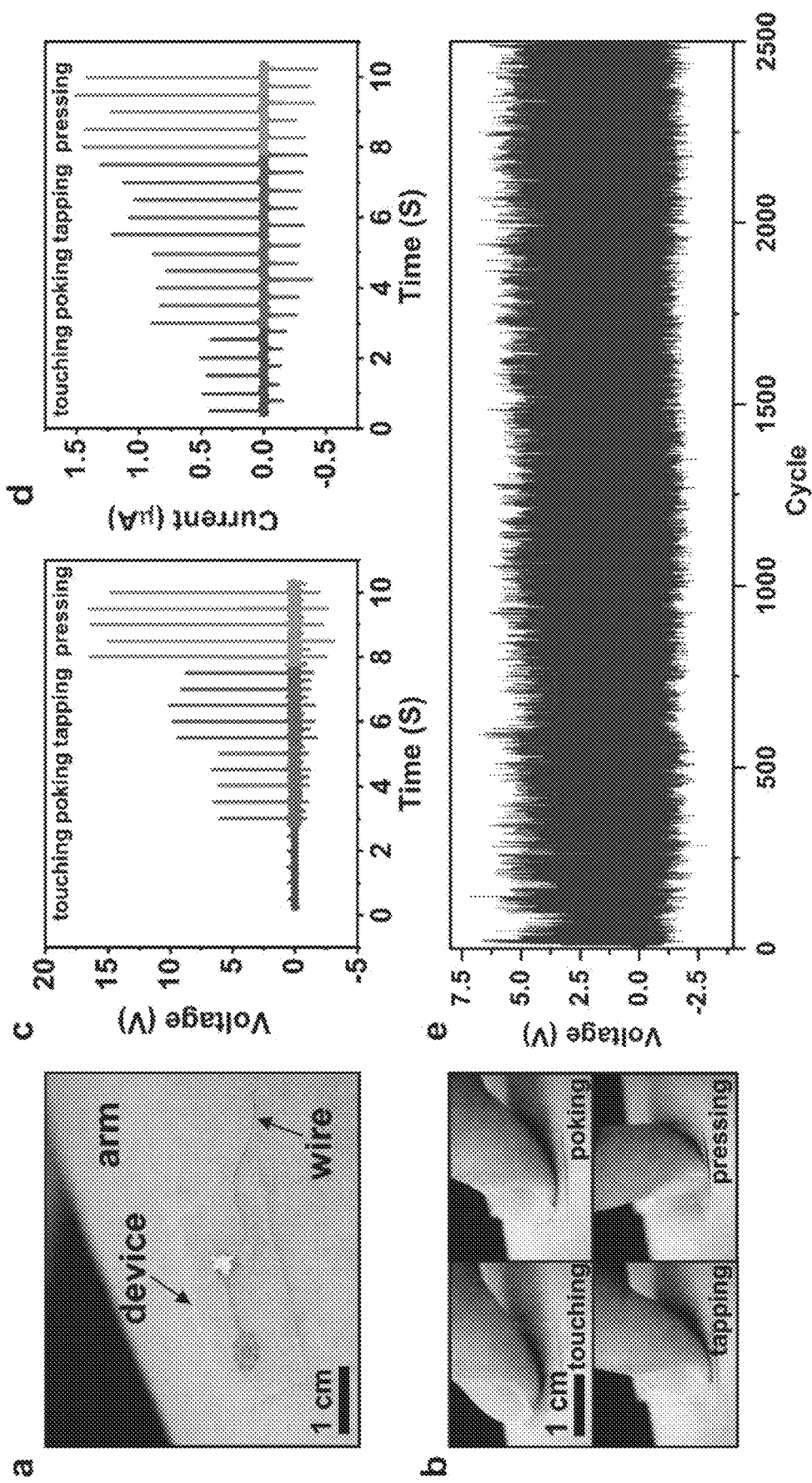
FIG. 14 are images and plots showing an example usage of the TENG for skin-integrated tactile sensing.

Referring to FIG. 14, in order to evaluate the practical application of the TENG sensors in realistic scenarios, one TENG single cell sensor was integrated on a volunteer's arm serving as E-skin for tactile sensing In this experiment, four types of common force by an index finger referring touching ($3.01 \pm 0.78$ kPa), poking ($15.43 \pm 1.12$ kPa), tapping ($26.31 \pm 1.45$ kPa) and pressing ($44.62 \pm 3.11$ kPa) were introduced to text the corresponding OC voltage and SC current, referring to image b in this Figure, different types of forces causing significant difference of skin deformation, while the TENG sensor can be conformably integrated with skin without delamination in all situations.

The outputs of OC voltage and SC current in the TENG under four types of loads were presented, with $0.50 \pm 0.03$ V and $0.46 \pm 0.04$ IA for touching, $6.27 \pm 0.27$ V and $0.85 \pm 0.05$ µA for poking, $9.41 \pm 0.51$ V and $1.16 \pm 0.11$ µA for tapping, and $15.79 \pm 0.84$ V and $1.41 \pm 0.11$ µA for pressing, respectively. In addition, referring to plot e, the durability of the TENG sensor was characterized by a finger poking (11.3-16.4 kPa) at frequency of 2 Hz for over 2500 cycles, where the signal outputs of the TENG was very stable. With reference to FIG. 15, no cracks and fractures of the electrodes in the TENG devices were observed by the microscope, even after thousands of cycles of testing, that explained the robust performance of the devices.

Furthermore, it was observed that the TENG device also maintained good adhesion with skin without any evidence of delamination from skin, showing its durability and great potential in long-term skin-integration. Encouraged by the excellent electrical and mechanical properties of the E-skin TENG sensors, referring to FIG. 16A to 16B, a smart glove embodiment assembling with 10 sensors at finger and palm areas were developed to show the potential application in human-machine interfacing and tactile mapping. Due to the low modulus of the substrate used in the TENGs, the devices can be directly mounted on the latex glove through Van Der Waals forces without additional tapes, and thus these sensors can act as tactile sensing units for mapping tactile information when grabbing an object. The smart glove can detect synchronous signals from different sensing unit as shown in FIG. 16D, and thus mapping the gesture and force distribution when holding a baker, as shown in the plot in FIG. 16C.

Figure 17:
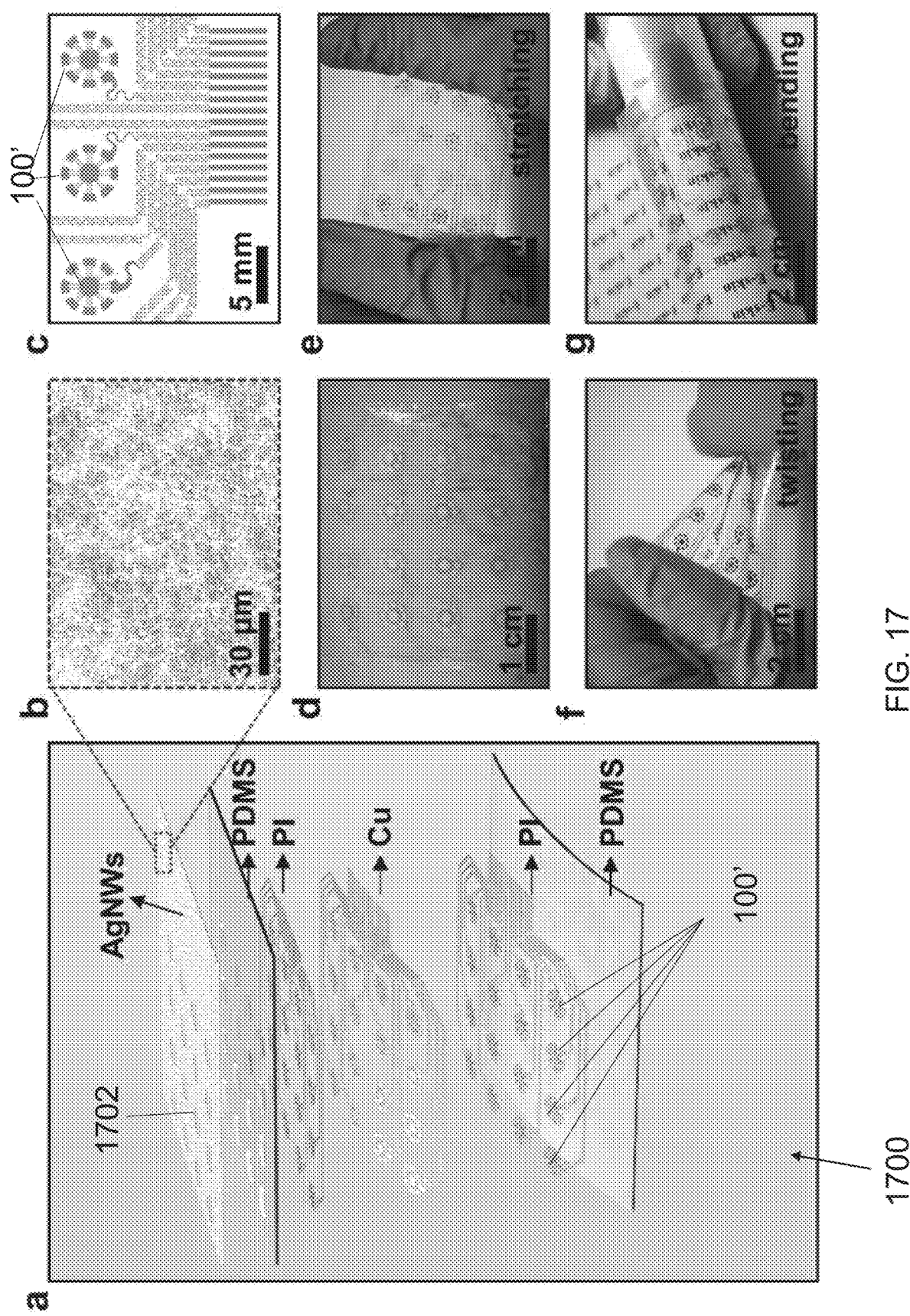
FIG. 17 is an overview of an electronic sensing apparatus in accordance with an alternative embodiment of the present invention, which is 4×4 tactile sensor array E-skin, in which a) is a schematic illustration of a 4×4 sensor array, b) is an SEM image of the AgNWs layer (the average sheet resistance of the AgNWs layer: 42.0 Ω/sq), c) is an enlarged illustration of the array layout, d) is an optical images of the array mounted on human arm, e) to g) are images showing the array under mechanical deformations including stretching, twisting and bending respectively.

With reference to FIG. 17, there is shown an alternatively embodiment of the present invention. In this embodiment, the electronic sensing apparatus 1700 comprises a plurality of triboelectric generator sensing units 100' each having the triboelectric generator, wherein the plurality of triboelectric generator sensing units are arranged across a predetermined area of the bottom substrate. Preferably, the plurality of triboelectric generator sensing units 100' are arranged in a two-dimensional array, such as a 4×4 array for detecting tactile inputs in this area covered by the array.

The 4×4 sensor array may be also fabricated through the same fabrication method as describe earlier with reference to FIG. 3. Additionally, silver nanowires (AgNWs) may be utilized as crosstalk shielding material due to their great conductivity, transmittance and flexibility.

In a preferred embodiment, the 4×4 array sensor further comprises a shielding layer arranged to suppress crosstalk between adjacent triboelectric generator sensing units. The shielding layer 1702 may be a layer of silver disposed between adjacent triboelectric generator sensing units 100'. For example, the shielding layer may be a silver nanowire network deposited by direct spray coating of silver nanowire on the top encapsulation layer with a shadow mask covering the triboelectric functional region on each of the at least one triboelectric generator. Effectively, a layer of silver is disposed between adjacent triboelectric functional regions to define the shielding layer 1702 for suppressing crosstalk between adjacent sensing units.

Followed by assembling of the TENGs sensors comprising the top and bottom PDMS layers 102/110, the opposite PI layers 104/108 and the sandwiched Cu electrode 106 using the method 300, the top layer of array may be treated with oxygen plasma for 3 min, then a layer of AgNWs network is formed onto the top layer 110 by spray-coating via a shadow mask covers the micro-structured regions 114. The AgNW layer was connected to the ground, serving as a shielding layer 1702. In addition, all the metal pads/fingers of the sensor units 100' of the array may be bond to anisotropic conductive films (ACF) for signal collection and data acquisition, referring to schematic c of FIG. 17.

Preferably, the electronic sensing apparatus 1700 having a plurality of triboelectric generator sensing units 100' may be used to detect a deformation of a plurality of points on the predetermined area, and/or pressure mapping of an external force applied on the plurality of points on the predetermined area, or to recognize an object in contact with the plurality of triboelectric generator sensing units.

Referring to FIG. 17, the 16 TENG sensors may be applied as a 4×4 self-powered E-skin tactile-sensing array for multiple-points tactile sensing. In the example embodiment as shown in illustration a, every TENG sensor serves as one tactile sensing unit cell, spacing 5 mm away from each other, and serpentine metallic traces connecting each unit individually for data collection and acquisition by an anisotropic conductive film. A layer of AgNWs networks (average sheet resistance of 42 Ω/sq) covers the top layer of the array except for the triboelectric regions, serves as the shielding layer, as shown in image b. The overall dimension of the arrayed device is 63 mm×47 mm×350 µm, and the weight is only 120 mg. Like the single sensor unit, the soft nature of the sensor array allows it being capable to mount on skin tightly through Van Der Waals force as shown in image d. The sensor array is also very robust that can be survived even after a series of intense deformations including stretching, twisting and bending, with unchanged performance as usual.

With reference FIGS. 18 and 19, to evaluate the capabilities of pressure mapping, three objects, including a small plastic block (1.64 g), a cutter (15.87 g) and a big plastic block (24.63 g) were sequentially put on the array and the sensing signal outputs were collected (from left to right). The sensing signals were accurately detected that can reveal information from the positions, to the weight of the tested objects referring to FIG. 19. The signal output amplitudes generally reflect the weights of the tested objects, however crosstalk is a very challenge problem in TENG based sensing arrays when the output is not great enough. Here, the TENG based array introduced AgNWs networks as the shielding layer that significantly solved the crosstalk issue, where the signals induced from no-contacted sensors were far lower (<25 mV) than the signal detected by the contact sensors (>hundreds mV).

Figure 20:
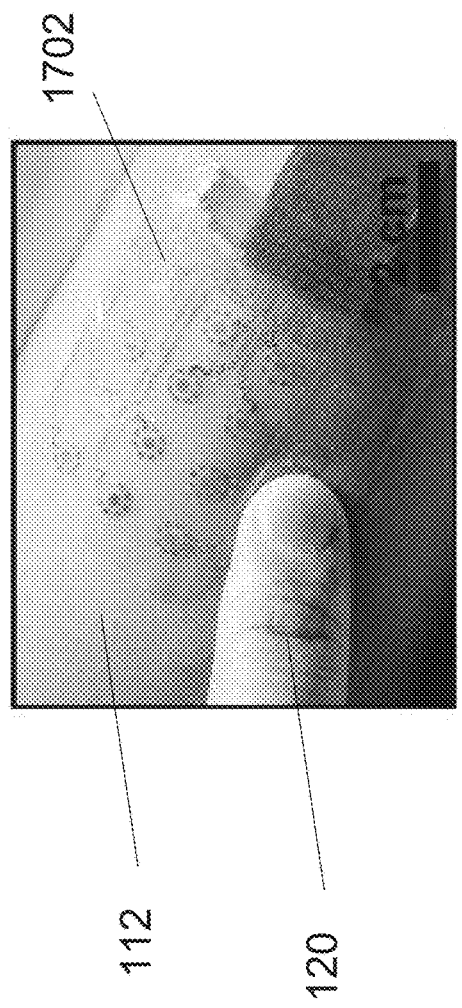
FIG. 20 is an image of the TENG array serving as E-skin mounted on arm and touched by a finger.
Figure 21:
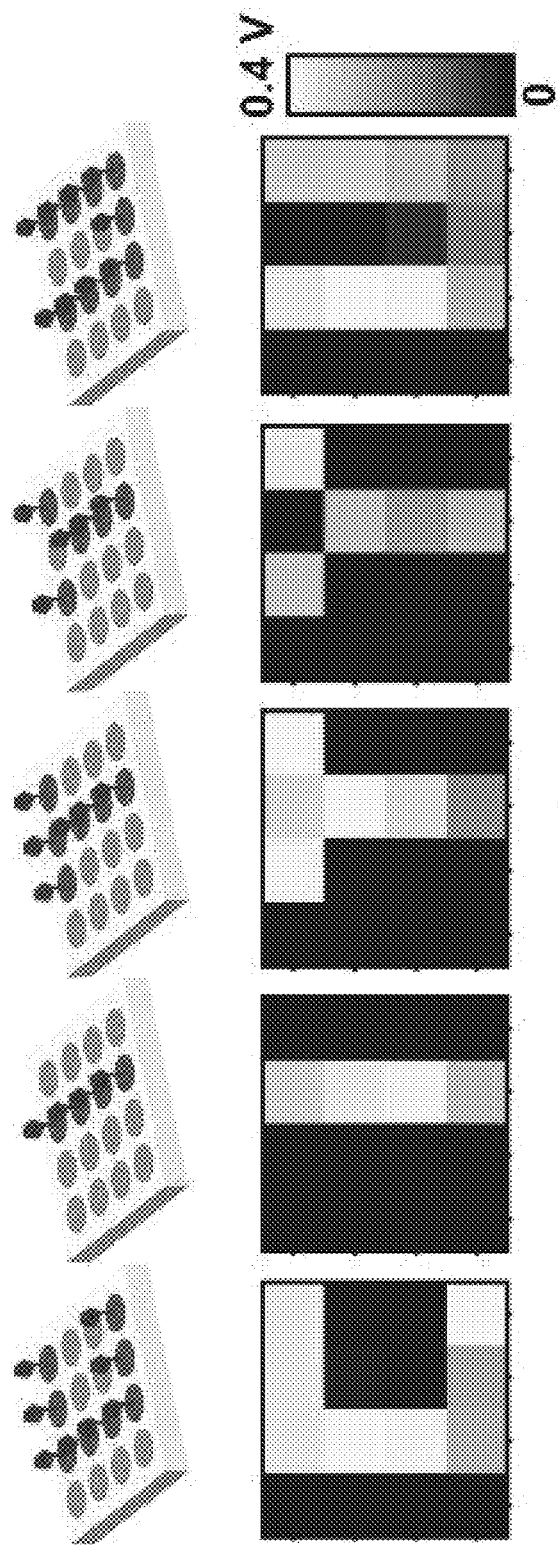
FIG. 21 are schematic illustration of the sensor array of FIG. 20 touched by a finger and drawn with a pattern of "CITYU" and the corresponding OC voltage distribution.

The great improvement owes to the AgNWs networks on non-sensing areas which significantly eliminate the electrostatic charges induction between neighbor sensing units. As a result, the signal distributions reveal great reflections of the objects' weights and shapes. In addition to text the sensor array on a rigid platform, with reference to FIG. 20, the device 1700 may be with integrated skin 112, where a user wearing the E-skin sensor array on his forearm, and wrote letters "CITYU" by a finger 120 on the E-skin. As a result, with reference to FIG. 21, the corresponding signals in the sensor array distributed as the same written pattern, with a maximum peak voltage of 400 mV and crosstalk free. Furthermore, the AgNWs networks is completely transparent and intrinsically stretchable that offers an excellent shielding performance to the array sensors.

In the experiments described above, the surface morphologies of the PDMS triboelectric layers were characterized by field emission scanning electron microscopy (SEM, FEI Quanta 450 FEG SEM). The surface roughness was measured by the optical surface profiler (OSP, Veeco/Wyko NT9300). The force applied on TENG was measured by load cell (CHLBS-min, ChuDa sensors). The open-circuit voltage of the TENGs was measured by a DAQ multimeter (Keithley 6510, sampling rate: 60 kHz) with ultra-high resistance. The short-circuit current of the TENGs was calculated by measuring the voltage through the PowerLab data acquisition (PL3516/P Powerlab 16/35, AD Instruments, sampling rate: 10 kHz) with low noise of a fixed value resistor connecting in series with the TENG. The OC voltage of 4×4 array was also measured by the PowerLab data acquisition with its 16 analog input channels. The sheet resistance of silver nanowires networks was measured by a four-wire measurement (HPS2523). The TENG was operated and tested on a volunteer body with his full and informed consent.

These embodiments may be advantageous in that, the present invention provides a thin, soft, stretchable, skin-integrated and self-powered E-skin tactile sensor based on triboelectric effect. The trampoline inspired mechanics design afforded the E-skin TENG sensors excellent stretchability, stable electrical performance and great long-term durability.

Advantageously, microstructures modifying enhanced self-powering efficiency and the resulted self-powered tactile sensors exhibit great sensitivity of 0.367 mV $Pa^{-1}$. The 2D trampoline inspired mechanics design allows the TENG based E-skin exhibiting excellent stretchability that enable stable tactile sensing with unchanged signal outputs under strain up to ~40%. It was observed that the simple sandpaper severed as mold enabled realizing microstructures in the triboelectric layer that can significantly improve the electrical performance of the soft TENGs.

Furthermore, simple coating AgNWs networks allowed the TENGs to be integrated into sensing arrays with no crosstalk issue. The transparent silver nanowires (AgNWs) networks via directly spray-coating as a shielding layer may effectively reduce the electrical crosstalk in TENG based tactile sensor arrays. As a result, the tactile sensor array is capable of integration on various kind of curved surfaces including skin to distinguish the shapes of contact objects as well as high-resolution tactile mapping. In addition, the TENG E-skin may also be applied in pressure mapping and human-machine interface or other self-power wearable applications such as artificial skin and flexible keyboards which may require multiple-points tactile sensing with high accuracy and larger scales.

It will be appreciated by persons skilled in the art that numerous variations and/or modifications may be made to the present invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. An electronic sensing apparatus comprising a triboelectric generator encapsulated between a bottom substrate and a top encapsulation layer, wherein the triboelectric generator is arranged to generate a triboelectric sensing signal in response to a deformation of the bottom substrate and/or the top encapsulation layer; the deformation including at least one of stretching, twisting, and bending of the bottom substrate and/or the top encapsulation layer, and/or a depression of the top encapsulation layer towards the bottom substrate; the triboelectric generator comprising a copper electrode sandwiched by opposite layers of polyimide; the top encapsulation layer comprising a triboelectric functional region overlapping with the copper electrode; the triboelectric charges are generated at the triboelectric functional region of the top encapsulation layer when the triboelectric functional region is in contact with an external object being electrically charged.

2. The electronic sensing apparatus in accordance with claim 1, wherein the triboelectric sensing signal is generated when the copper electrode is charged by the electrically charged triboelectric functional region, upon the external object separates from the triboelectric functional region of the top encapsulation layer.

3. The electronic sensing apparatus in accordance with claim 1, wherein the triboelectric functional region is charged when being touched.

4. The electronic sensing apparatus in accordance with claim 3, wherein the triboelectric functional region of the top encapsulation layer includes a roughen structure defined by a plurality of micro-structures.

5. The electronic sensing apparatus in accordance with claim 4, wherein the roughen structure is arranged to deform a skin surface in contact with the plurality of micro-structures on the triboelectric functional region thereby increasing an effective contact area between the skin surface and the top encapsulation layer at the triboelectric functional region.

6. The electronic sensing apparatus in accordance with claim 4, wherein the micro-structures includes pyramid structures.

7. The electronic sensing apparatus in accordance with claim 1, wherein the bottom substrate and the top encapsulation layer includes PDMS.

8. The electronic sensing apparatus in accordance with claim 7, wherein the bottom substrate is adapted to adhere to a skin surface by Van Der Waals forces.

9. A method of producing an electronic sensing apparatus in accordance with claim 1, comprising the step of:
coating a layer of polymer on a sandpaper having a predetermined grit size;
peeling off the layer of polymer from the sandpaper after the layer of polymer is cured to form a top encapsulation layer of the electronic sensing apparatus; and attaching the encapsulation layer to a bottom substrate with at least one triboelectric generator disposed thereon, thereby encapsulating the at least one triboelectric generator;

wherein the top encapsulation layer is defined with a triboelectric functional region on each of the at least one triboelectric generator, the triboelectric functional region is defined with a roughen structure defined by a plurality of micro-structures formed upon peeling off the layer of polymer from the sand paper.

10. The method of claim 9, further comprising the step of defining the triboelectric functional region using photolithography.

11. The method of claim 10, wherein the step of defining the triboelectric functional region using photolithography comprises the steps of, prior to coating the layer of polymer on the sandpaper, coating a layer of photoresist on the sandpaper and patterning the layer of photoresist using photolithography.

12. The method of claim 9, further comprising a step of providing a shielding layer on the top encapsulation layer defined with a plurality of triboelectric functional regions, wherein the shielding layer comprises a layer of silver disposed between adjacent triboelectric functional regions.

13. The method of claim 12, wherein the shielding layer is deposited by direct spray coating of silver nanowire on the top encapsulation layer with a shadow mask covering the triboelectric functional region on each of the at least one triboelectric generator.

14. An electronic sensing apparatus comprising a triboelectric generator encapsulated between a bottom substrate and a top encapsulation layer, wherein the triboelectric generator is arranged to generate a triboelectric sensing signal in response to a deformation of the bottom substrate and/or the top encapsulation layer; the deformation including at least one of stretching, twisting, and bending of the bottom substrate and/or the top encapsulation layer, and/or a depression of the top encapsulation layer towards the bottom substrate; the triboelectric generator comprising a copper electrode sandwiched by opposite layers of polyimide; the top encapsulation layer comprising a triboelectric functional region overlapping with the copper electrode, wherein the copper electrode comprises a middle island overlapping with at least a portion of the triboelectric functional region of the top encapsulation layer, and a metal pad electrically connected to the middle island, the metal pad is arranged to facilitate an output of the triboelectric sensing signal.

15. The electronic sensing apparatus in accordance with claim 14, wherein the middle island and the metal pad is connected by a serpentine metallic trace arranged to alter the triboelectric sensing signal when being subjected to a stretching deformation.

16. The electronic sensing apparatus in accordance with claim 15, wherein the copper electrode further comprises a plurality of peripheral islands surrounding the middle island and each being electrically connected to the middle island with an intermediate serpentine metallic trace.

17. The electronic sensing apparatus in accordance with claim 16, wherein each of the plurality of peripheral islands is connected to the middle island with a pair of intermediate serpentine metallic traces.

18. The electronic sensing apparatus in accordance with claim 16, wherein the copper electrode is arranged to detect a stretching deformation of the bottom substrate and/or the top encapsulation layer in both in-plane and out-of-plane directions.

19. An electronic sensing apparatus comprising a triboelectric generator encapsulated between a bottom substrate and a top encapsulation layer, wherein the triboelectric generator is arranged to generate a triboelectric sensing, signal in response to a deformation of the bottom substrate and/or the top encapsulation layer; the deformation including at least one of stretching, twisting, and bending of the bottom substrate and/or the top encapsulation layer, and/or a depression of the top encapsulation layer towards the bottom substrate; the triboelectric generator comprising a copper electrode sandwiched by opposite layers of polyimide; the top encapsulation layer comprising a triboelectric functional region overlapping with the copper electrode, the electronic sensing apparatus further comprising a plurality of triboelectric generator sensing units each having the triboelectric generator, wherein the plurality of triboelectric generator sensing units are arranged across a predetermined area of the bottom substrate.

20. The electronic sensing apparatus in accordance with claim 19, wherein the plurality of triboelectric generator sensing units are arranged in a two-dimensional array.

21. The electronic sensing apparatus in accordance with claim 19, further comprising a shielding layer arranged to suppress crosstalk between adjacent triboelectric generator sensing units.

22. The electronic sensing apparatus in accordance with claim 21, wherein the shielding layer comprises a layer of silver disposed between adjacent triboelectric generator sensing units.

23. The electronic sensing apparatus in accordance with claim 22, wherein the shielding layer comprises a silver nanowire network.

24. The electronic sensing apparatus in accordance with claim 19, wherein the plurality of triboelectric generator sensing units are arranged to detect a deformation of a plurality of points on the predetermined area, and/or pressure mapping of an external force applied on the plurality of points on the predetermined area.

25. The electronic sensing apparatus in accordance with claim 24, wherein the electronic sensing apparatus is arranged to recognize an object in contact with the plurality of triboelectric generator sensing units.

26. The electronic sensing apparatus in accordance with claim 24, wherein the electronic sensing apparatus is arranged to operate as a human-machine interface device.

* * * * *